US012492042B2

(12) United States Patent
Cutter

(10) Patent No.: US 12,492,042 B2
(45) Date of Patent: Dec. 9, 2025

(54) RETURNABLE SHIPPING CONTAINER

(71) Applicant: Lawrence D. Cutter, New Paltz, NY (US)

(72) Inventor: Lawrence D. Cutter, New Paltz, NY (US)

(*) Notice: Subject to any disclaimer, the term of this patent is extended or adjusted under 35 U.S.C. 154(b) by 203 days.

(21) Appl. No.: 17/871,962

(22) Filed: Jul. 24, 2022

(65) Prior Publication Data
US 2022/0355977 A1 Nov. 10, 2022

Related U.S. Application Data

(62) Division of application No. 16/728,643, filed on Dec. 27, 2019, now Pat. No. 11,427,385.

(51) Int. Cl.
| | |
|---|---|
| *B65D 43/16* | (2006.01) |
| *B65D 25/10* | (2006.01) |
| *B65D 51/24* | (2006.01) |
| *B65D 77/26* | (2006.01) |

(52) U.S. Cl.
CPC ......... *B65D 25/102* (2013.01); *B65D 25/101* (2013.01); *B65D 43/16* (2013.01); *B65D 51/245* (2013.01); *B65D 77/26* (2013.01); *B65D 2203/02* (2013.01); *B65D 2203/10* (2013.01); *B65D 2251/1016* (2013.01)

(58) Field of Classification Search
CPC ...... B65D 43/20; B65D 75/545; B65D 51/28; B65D 51/245; B65D 2203/02
USPC .......................................................... 40/312
See application file for complete search history.

(56) References Cited

U.S. PATENT DOCUMENTS

| | | | | |
|---|---|---|---|---|
| 1,421,964 A | * | 7/1922 | Langford | B65D 51/245 40/649 |
| 1,539,523 A | * | 5/1925 | Spraggins | B65D 5/4204 229/162.1 |
| 1,980,687 A | * | 11/1934 | Lassen | B42F 17/00 40/724 |
| 2,087,496 A | * | 7/1937 | Beasley | B65D 43/20 217/15 |
| 3,812,960 A | * | 5/1974 | Falletta | B65D 25/107 206/394 |
| 4,105,112 A | * | 8/1978 | Graf | B65D 43/164 40/313 |
| 4,947,989 A | * | 8/1990 | Horton | G11B 23/0233 40/442 |
| 5,299,711 A | * | 4/1994 | Romick | A61J 1/03 206/534 |

(Continued)

FOREIGN PATENT DOCUMENTS

WO WO-9936322 A1 * 7/1999 ........... B65D 21/045

*Primary Examiner* — Mollie Impink

(57) ABSTRACT

Structures and a method for restraining a package within a returnable shipping container are provided to eliminate the need for buffering or filler materials (dunnage), particularly those materials that are environmentally unfriendly and otherwise likely to be discarded. Desirable shipping containers intended for reuse are provided with various features which enhance their utilization in a cycle of transportation out from and back to a source. These features include those associated with security, integrity, protection from the environment, addressing, automation, payment, inspection, education in volume for return, facilitation for tracking the container throughout the transport route and assurance of its eventual return.

13 Claims, 27 Drawing Sheets

(56) References Cited

U.S. PATENT DOCUMENTS

| | | | | |
|---|---|---|---|---|
| 5,755,180 A | * | 5/1998 | Smith | A01K 13/00 |
| | | | | 40/725 |
| 2009/0266722 A1 | * | 10/2009 | Rogers | B65D 81/1275 |
| | | | | 206/521 |
| 2016/0039574 A1 | * | 2/2016 | Barlas | B65D 27/06 |
| | | | | 206/459.5 |

* cited by examiner

RETURNABLE SHIPPING CONTAINER

CROSS-REFERENCE TO RELATED APPLICATIONS

This application is a divisional application which is related to the subject matter of the following application which is assigned to the same assignee as the present application. The application listed below is hereby incorporated herein by reference in its entirety:

Application Ser. No. 16/728,643 filed on Dec. 27, 2019 and issued as U.S. Pat. No. 11,427,385 on Aug. 30, 2022.

TECHNICAL FIELD

The present invention is generally directed to shipping containers of the type used to ship packages, parcels and other goods through the mail, postal service or via other transporters of goods. More particularly, the present invention is directed to a system and method for using returnable containers. Even more particularly, the present invention is directed to the manufacture, production and usage of returnable containers which are consistent with and take advantage of automation both in terms of identifying outbound and return address locations and in providing automated package loading, storage and shipping and which are capable of functioning in inclement weather conditions and/or climates.

BACKGROUND OF THE INVENTION

There are millions of packages shipped every day which use cardboard or other forest or plant products in a one-way fashion wherein the packaging material is disposed of at the destination in landfills or in other garbage receiving sites. Packaging material includes not only the aforementioned cardboard, but also plastic material in the form of bubble wrap or pre-filled air cushions or "packing balloons." This wasted packaging also often includes wrapping paper, crumpled paper or fiber fill. In addition, packaging also is found which contains Styrofoam® (generically: closed-cell extruded polystyrene foam) peanuts. All of the packaging is either wasted or possibly, though not certainly, recycled. The present invention seeks to eliminate all of this unnecessary packaging material and the harm to the environment that ensues from its use. Accordingly, there is a need to avoid sending these wasted materials through the chain of commerce in the first place.

Transmitting packages through any delivery system or through any delivery service supplier and even from different manufacturers requires certain features that are essentially being provided by current delivery and packaging methods. For example, current cardboard packaging systems guard against at least some level of water damage, major flooding not being included. Thus, any such system should provide at least the current level of protection against water damage from its usual causes, including, but not limited to, packages being left in the rain or being left when precipitation is unanticipated but comes nonetheless.

One other feature of the current system that should be duplicated in any replacement system is, in one word, "security." For example, once a manufacturer, seller or transshipper places goods in any kind of container, there should be a mechanism to guard against tampering. Security exists in essentially two forms: (1) prevention of entry into the interior of the container by unauthorized individuals; (2) indicators showing that tampering has occurred, the indication being either overt or covert. It is noted that current package and parcel delivery systems are extremely deficient in this regard. Individuals receiving a package have not had an opportunity to see the package being prepared. Unscrupulous individuals who intercept a package are not constrained to duplicate the original wrapping or even to come close. Sealing tape is easily cut and replaced without fear of discovery. Even currier services are subject to this vulnerability. Any substitute for the current system should be at least as secure. However, it is noted that the absolute level of security in any of the existing means of delivery is, in fact, extremely low. In particular it is noted that, in the current, usual package delivery pipeline, there is absolutely no guarantee that a package has not been opened, that the product requested is the one in the container or that there is nothing in the container except perhaps a "brick" of equal weight. The point here is that current levels of package security are extremely low, if not actually nonexistent.

One of the positive aspects of the system of the present invention is the use of multiple machine readable indicia on the exterior of the package. These indicia may take the form of either 2D (that is, two dimensional codes such as the QR coding scheme which is capable of "storing" over 4,000 alphanumeric characters) or 1D (that is, linear) bar codes. These codes are, however, currently only being used to provide a destination address. When one is concerned with returnable packaging which is returned to the source of the goods (that is, manufacturer, store, company, retailer, wholesaler or the like), there is now a desire to provide more than one external, machine readable code. Simply placing two such codes on the outside of a package would be confusing to any automated reading system, very likely leaving it incapable of discriminating between source and destination. Accordingly, in a system in which packaging material is to be returned to the source (or to an address determined by the source), there should be a mechanism for dual addressing.

One of the further disadvantages of current packaging systems is that automated package preparation is limited at best. Cardboard boxes can be cut to size, folded and glued using automated methods and exterior addressing may even be generated and applied by machine. However, many shippers of goods are suppliers of items of varying dimension. This means that automation stops at this juncture. At this point, human intervention is often required to decide how best to fill any remaining space between the item in the container and the exterior of the container itself. This might meaning making a decision as to how many buffering packaging balloons to add, how much (news)paper to crumple up, how much "packing straw" to add or how many Styrofoam® peanuts (or the like) to pour in the container so as to surround and protect the item being shipped. The use of this extraneous material has at least four distinct disadvantages: (1) it interferes with the use of automated packaging steps in that it often requires human judgment; (2) it requires its own manufacture, transport, handling and existence apart from the container itself; (3) it is typically discarded rather than being recycled; and (4) being discarded means that it unnecessarily adds to the contents of landfills.

From the above, it is seen that there exists a need in the art to overcome the deficiencies and limitations described herein and above.

SUMMARY OF THE INVENTION

The shortcomings of the prior art are overcome and additional advantages are provided in a systematic way by addressing the problems of loading, sealing, stacking, security, bulk size upon return, addressing and "return postage." As used herein, the phrase "return postage" refers generally to the cost incurred in returning the shipping container back to a location for its reuse; it is not limited to any fee that may be collected by the US Postal Service. The present invention provides cooperative arrangements of structures and information transmission and storage entities which not only eliminate the use of one time only packaging but which provides significant advantages for overall process and delivery automation.

In a first and important aspect of the present invention there is provided an internal restraint system which affixes a package to be delivered within the interior of the container in a manner which prevents movement during transport and which therefore provides package protection. In one aspect of the loading and restraint system of the present invention, the interior of the container is provided with ridges or slots on two or more of its vertical side walls which operate in conjunction with one or more flexible retaining elements which are easily snapped into place to hold the package. An alternative to flexible retaining elements is the use of one or more elastomeric cords or even the use of material in the form of a belt which can easily be cinched up.

In yet another aspect of the present invention several different methods are provided for the purpose of sealing the container against external weather or weather-like forces such as rain, wind and snow. In one embodiment of the present invention, a container is provided with a slidable top which seals against an O-ring type of gasket. In yet another embodiment of the present invention, a slidable top is provided with portions which extend downward over the edge of the container to avoid water entry from above. This embodiment may or may not employ the above-mentioned O-ring. A third embodiment which prevents damage from elemental causes employs a top which snaps into place and which includes peripheral portions which extend downward over the top of the container. In various embodiments of the present invention, a top (also referred to herein as a lid or cap) extends over the top edges of the container. One end of the top may be provided with a hinge pin which permanently connects the top with the bottom (rest of) of the container. This arrangement is advantageous in that it no longer becomes necessary to separately keep track of the top and bottom of the shipping container.

With respect to the issue of security, the system of the present invention provides several different options. In a first embodiment, a snap tie similar to that employed by law enforcement as a substitute for handcuffs, is inserted through an aperture in the lid and through another aperture in the bottom portion of the container so as to lock the two together until received at a destination. Similarly, for this purpose a small combination lock may likewise be inserted through these same two apertures in the lid and the container. A lock which is accessed using a physical key is also employable but this introduces the necessity of providing a physical key via a different shipping route. It is not out of the realm of possibility that this physical key is one that is made by a 3D printer at the recipient's destination by means of a file transmitted for use by the 3D printer.

The present invention also contemplates the usage of an inexpensively constructed and built-in combination lock which is designed to be substantially flat so that it may be incorporated into a mechanism for holding the lid in place until it is unlocked. In one embodiment, a relatively insecure combination lock is employed and in another embodiment, using similar structural elements a true combination lock is employed and can accommodate any convenient number of digits which need to be selected for opening purposes. It is, however, not supposed that containers of the present invention are immune from what might be called sledge hammer tactics to achieve an opening of the package. Then again, this is likewise not true of present systems. It is, however, noted that the containers described herein are capable of being fabricated from metallic materials for which brute forced tactics can be made to be extremely difficult, none of which is to say that such packaging would be immune to the effects of an acetylene torch. Of note, however, is that the security measures that are incorporated into the design of the present container are extremely superior to the present system in which security is essentially non-existent.

In other embodiments of the present invention, the problem of providing more than one address is also contemplated. More particularly, in one embodiment, the present invention includes a top window with a slidable element which is readily moved from a first position in which an original destination address is visible to a second position in which a second, return address is visible. This slidable element is affixed to the top of the present container in a manner which is intended to prevent accidental movement during the transportation process.

In another embodiment of the present invention which is directed to the issue of having both a destination address and a different return address the top lid (or any other convenient side of the container) is provided with a transparent window through which destination information is visible in two forms: an address which can be scanned by machine (such as a QR code) and a second version of the same address which is human readable. This address information is printed at the point of shipment and inserted into a slot on the underside of the lid so that it is viewable through the transparent window but yet resides in a securable area. The medium on which this dual-address information is printed may also contain return address information printed on its back. When the package is opened, this medium is flipped over and re-inserted into the slot in the underside of the lid. Alternatively, a second medium with the return address information is provided and which, during shipment, lies beneath the first medium which has the return address information. During shipment, original destination information is visible and is typically provided by the shipper/manufacturer. This information is provided on one side of a medium which is inserted into a slot on one of the sides of the container, preferably its top or lid. This slot is preferably located inside the container and is visible to the outside through a sufficiently transparent window. This placement and configuration prevents easy tampering with the address of the intended recipient. After the container is opened by the recipient, the medium is flipped over so that the address to which the container is to be returned is now visible. As with the first side of the medium, as typically provided by the original sender, the second side of the medium includes the return address return address for the container in both human and machine readable form.

The present invention also preferably incorporates several other desirable features. For example, the upper portion of a container is preferably mated with a corresponding lower portion of a similar container with which it is positioned in a stack. In other words, containers of the present invention are preferably structured so as to be readily arranged in a single stack. Likewise, given that the present invention is intended for multiple uses which (may or may not) require its return to a source destination, it is desirable that, in appropriate circumstances, the package being returned is smaller, at least in volume. Accordingly, containers structured in accordance with one aspect of the present invention may be made to be collapsible and readily locked into a collapsed state for return transport, if necessary.

Lastly, the system of the present invention contemplates the utilization of a machine readable tag affixed to a container and/or its associated lid, preferably at the time of manufacture. Typically, this tag is an RFID type of device and most notably includes a unique serial number. It is noted that the issue of providing unique serial numbers has been solved in other disciplines such as the one that allocate serial numbers called "mac addresses." If the lid is separable, the tags of the present invention are includable in both the top and bottom portions of the container. In particular, the tags used employ a coding indicia which indicates whether the tag is placed on the bottom or the top of the container (the top preferably being a slidable portion, a snap on portion or a hinged portion of the container). In a preferred embodiment, which employs a hinge mounted top, the top and bottom portions of the container are not separated in normal use and transport. This obviates the need or desire for dual (RFID) tags. The use of a machine readable tag ensures that payment indicia associated with the container may be matched against a "payment due" list.

In particular, the system of the present invention employs tags such as the RFID devices discussed above together with machine-readable indicators associated with a particular use of the container. In particular, the exterior, visible, machine readable tag (for example, a QR code) employed in the container tops preferably includes a unique serial number which is conjoined with a time and/or date stamp to provide a unique identifier for the particular transaction in which the present invention is being employed. That is, the unique tag-source serial number together with a date/time stamp uniquely identifies a shipment transaction together with a likely return transport date of the container itself back to its source. The machine-readable tag, together with externally applied machine-readable information which is associated with a particular shipping transaction is seen to significantly advance the automated handling of all processing and to eliminate the need to apply "postage" to a parcel.

Given that a unique identifier may be provided with the container in the form of an RFID chip (or other permanent marking) and given that, particularly for US Postal Service considerations, it may be necessary to open a package, it is noted that the present invention provides a mechanism for doing so in an easy and unobtrusive manner. In particular should it be necessary for a shipping entity to legally determine the contents of a package, the shipping entity need only provide the container manufacturer with the container identifier in which case the container manufacturer should be able to access their manufacturing database to properly associate the container identifier with appropriate security information to bypass a built in combination lock.

Accordingly, it is an object of the present invention to provide a container which is returnable to its sender and to eliminate wasteful packaging.

It is another object of the present invention to provide a system and method for loading and anchoring packages which are to be transported in a way which especially facilitates the use of automation and robotic handling.

It is yet another object of the present invention to provide a returnable container which is more secure against damage from the elements.

It is a still further object of the present invention to provide a returnable container which exhibits greater levels of security in terms of tamper resistance.

It is also an object of the present invention to provide a returnable container which is resistant to, but consistent with, conditions of weather and climate.

It is yet another object of the present invention to provide a container, system and method in which automated processing is used to as great an extent as possible.

It is another object of the present invention to provide a packaging and container system which is consistent with legally required demands for access for identifying container contents.

It is still another object of the present invention to provide a returnable shipping container which eliminates the need for postage stamps and which is readily trackable throughout the delivery process and whose transportation payment for return is authorizable for a specific period of time.

Lastly, but not limited hereto, it is an even further object of the present invention to provide a returnable shipping container together with associated features which serve to enhance its protection from the elements, its resistance to tampering, its returnability and its capability for automated processing both in terms of transport and payment of associated transportation duties.

Additional features and advantages are realized through the techniques of the present invention. Other embodiments and aspects of the invention are described in detail herein and are considered a part of the claimed invention. References herein using words such as "top," "bottom," "front," "back," or "sides" are intended for the sole purpose of enhancing the description and use of the present invention in the mind of the reader and is not intended in any way to refer to any absolute direction, position or orientation.

The recitation herein of certain desirable objects which are met by various embodiments of the present invention is not meant to imply or suggest that any or all of these objects are present as essential features, either individually or collectively, in the most general embodiment of the present invention, or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following descriptions taken in connection with the accompanying drawings in which:

DETAILED DESCRIPTION

Figure 1:
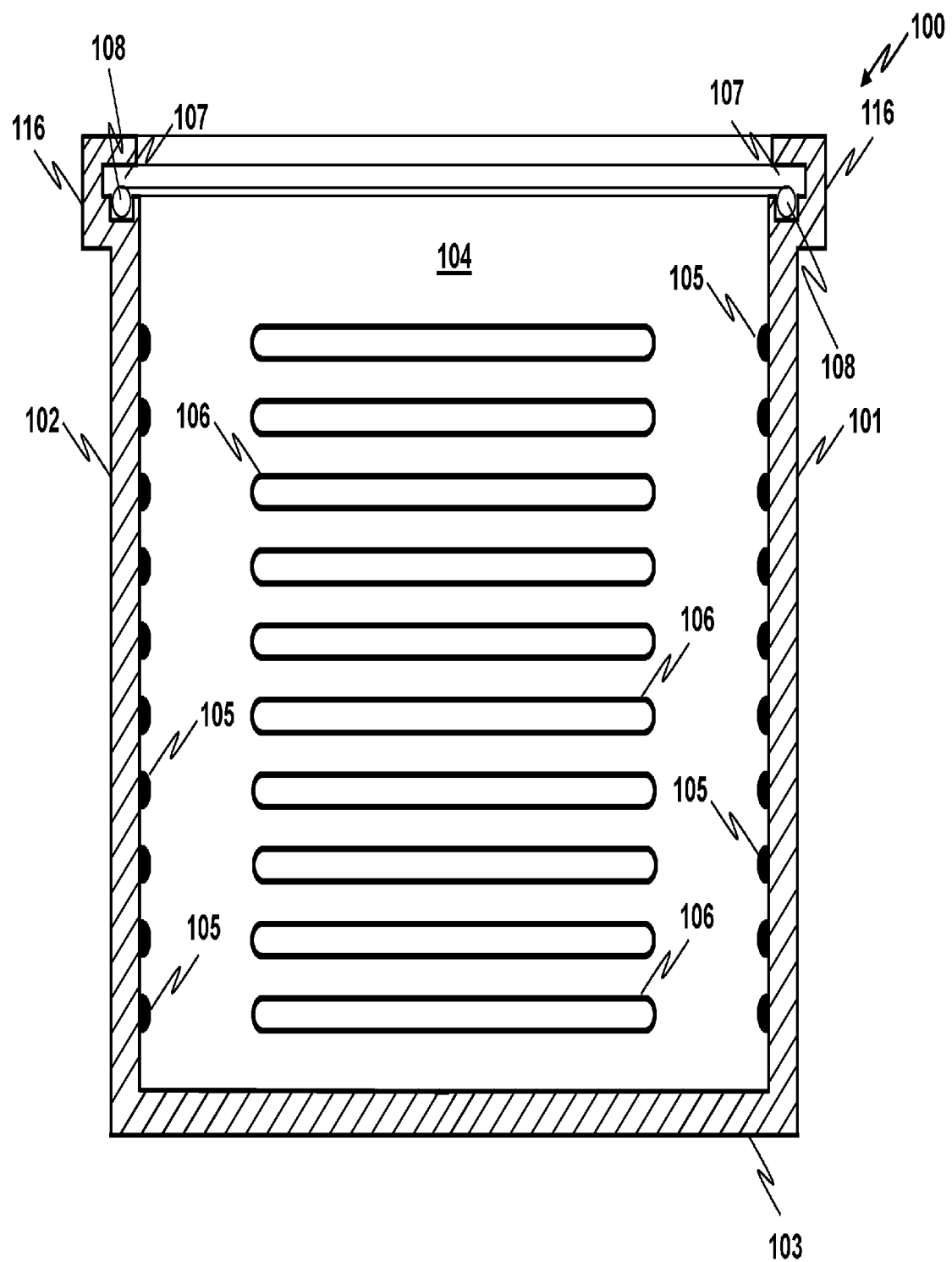
FIG. 1 is a cross-sectional, front view of a container in accordance with the present invention employing slots or ridges for product retention.

As discussed above, one of the driving motivations for the present invention is the elimination of unnecessary packaging material and filler. Even if such material is ultimately recycled, its production, nonetheless, represents wasted energy and resources. Accordingly, it is a major object of the present invention to provide a packaging structure and system in which the container in which a package is delivered is returned to its source. This packaging structure is typically referred to herein as the shipping container which, however, is not to be confused with railroad sized carriers having a similar name. Nevertheless, it is recognized that improvements in any package delivery system should also incorporate other features that make its utilization more economical and more efficient. These other features include issues of security, size of the returned shipping container, payment for return shipping, the use of automation, address preparation, stacking for storage, deposit collection and weather protection, to name just a few. These issues are discussed under the various headings set forth below.

Loading and Anchoring the Package

Accordingly, it is noted that one area of package processing that is currently highly inefficient and difficult to automate is the positioning and securing of a package within a shipping container. Such shipping containers are currently typically cardboard boxes. These cardboard boxes require relatively high density paper and various adhesive materials in their construction and adhesive tape to hold them together. Furthermore, in order to securely position a package within such a cardboard box, as discussed above, the cardboard box is further filled with various filler materials which are, like the cardboard box itself, either discarded or introduced into a recycling stream. Even if recycled, these materials also require resources and energy for their production and, likewise, the recycling of these materials comes with its own cost both in terms of transportation and processing.

Accordingly, it is seen that it is highly desirable to be able to provide a packaging and transport system which eliminates all of the filler material that typically accompanies a package in a cardboard box. Similarly, it is also highly desirable to be able to eliminate the cardboard box itself via a return method for the shipping container. The present invention therefore seeks to eliminate the waste of all of this material and to provide a convenient return path in which all of the packaging filler, including the container, is returned to the source (or other indicated return destination).

If one is going to eliminate package filler material, it nonetheless still becomes extremely desirable to position and anchor a package to be transported within the desired container, this being one of the purposes of filler materials. A mechanism for accomplishing this goal is illustrated in FIGS. 1, 2, 3 and 4. In particular, a container produced in accordance with the present invention includes ridges 105 or slots 106 into which a flexible retaining element 150 is disposed. In an important aspect of the present invention retaining element 150 is positioned over package 130 and its ends are pushed down along the sides of container 100 so as to engage ridges 105. In this manner, package 130 is firmly held in position.

Retaining elements 150 are provided in different sizes and thickness to accommodate packages having different sizes and weights. In a typical ordering process, the size and weight of an ordered product is known. Based on this information, a container and retaining element of appropriate size is automatically selected and retrieved on the warehouse floor. As discussed below, the container is preferably provided with a machine readable (RFID or the like) tag with information pertaining to the particular container selected. Exemplary information indicia are set forth below in Table I.

Figure 3:
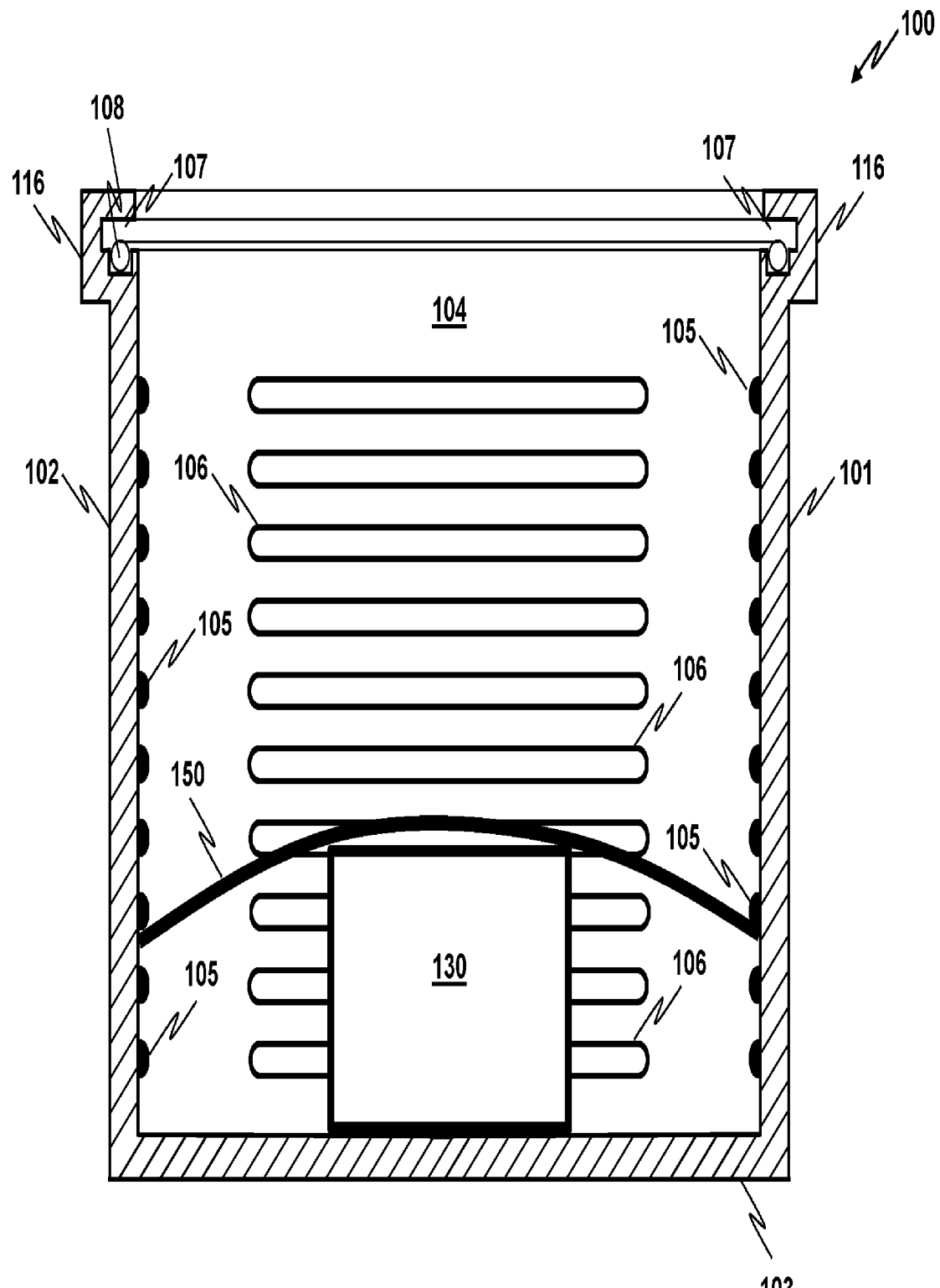
FIG. 3 is a cross-sectional, front view similar to FIG. 2 but which more particularly illustrates the placement and retention of a package intended for delivery within the container.
Figure 11:
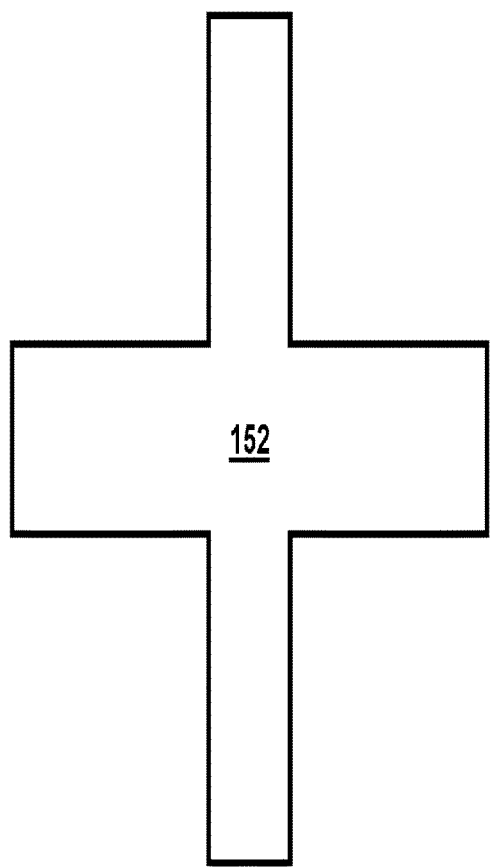
FIG. 11 is a top view of a single-piece retaining element whose end portions are intended to engage slots and/or ridges in the front and in the back and/or sides of the container for the purpose of holding the package intended to be delivered, in a fixed position for transport.
Figure 12:
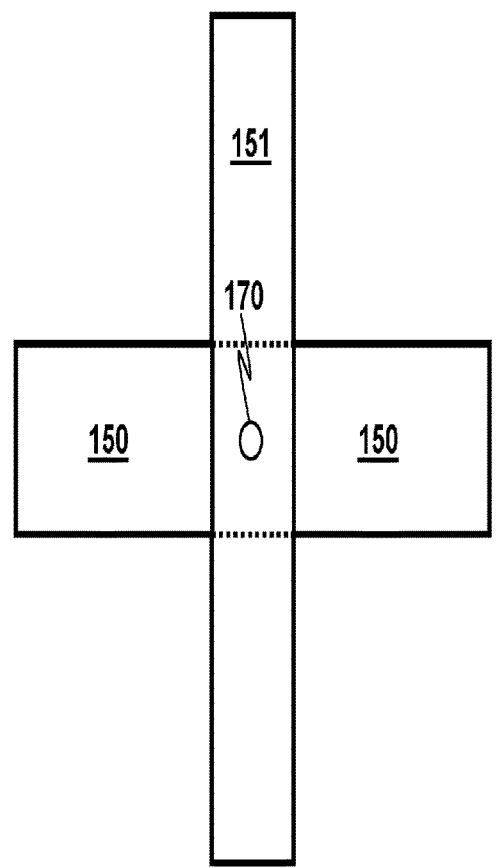
FIG. 12 is a top view of a retaining element similar to that shown in FIG. 11 except that it is provided as two separate pieces.

While FIG. 3 illustrates that package 130 is anchored and positioned against side to side motion, it is noted that FIGS. 11 and 12 illustrate retaining elements 150, 151 and 152 which also anchor package 130 against motion in a front to back direction. In particular, FIG. 11 illustrates an embodiment in which retaining element 152 comprises a unitary structure. Alternatively, as shown in FIG. 12 separate retaining structures 150 and 151 are employed.

In embodiments of the present invention in which container 100 is intended to be collapsible for return transport, retaining elements such as 150 and 151 are preferred since they are more easily placed in a collapsed container for a return trip. It is also noted that, in certain circumstances, such as in the shipment of more than one book, there is the possibility that one book could slide over another thus rendering the retaining structure of the present invention less effective. Accordingly, in such circumstances, it is noted that it is very easy to employ multiple levels of retaining elements, effectively duplicating those shown in FIGS. 3, 11 and 12.

FIGS. 1 and 3 suggested that ridge structures 105 are employed on sides 101 and 102 of container 100 while slots are employed on back 104 of container 100. However, while the utilization of ridges is preferred, slots or ridges may be deployed on the front, back or the sides as desired. The more important aspect of the retention structure of the present invention is that it is readily employed in an automated fashion. In the present invention it is only necessary to dispose a package to be shipped in a central portion on the bottom of the package. From there, automated machinery or other robotic assembly means are simply able to place whatever desired retaining structure is to be employed in position over package 130 and then the ends of the retaining structure are pressed down so as to engage either ridges or the slots. In this way, package 130 is firmly held in place within container 100. Retaining elements 150, 151 or 152 are returnable within the inside of container 100. No filler material is employed. Nothing is wasted. Nothing needs to be recycled. The packaging is automated. It is then desirable that the container with retaining elements 150, 151 and/or 152 be returned to an indicated source, an issue which is addressed by yet other aspects of the present invention. While return of retaining elements 150, 151 indoor 152 is certainly desired, is not absolutely essential for the practice of all of the embodiments of the present invention.

Figure 8:
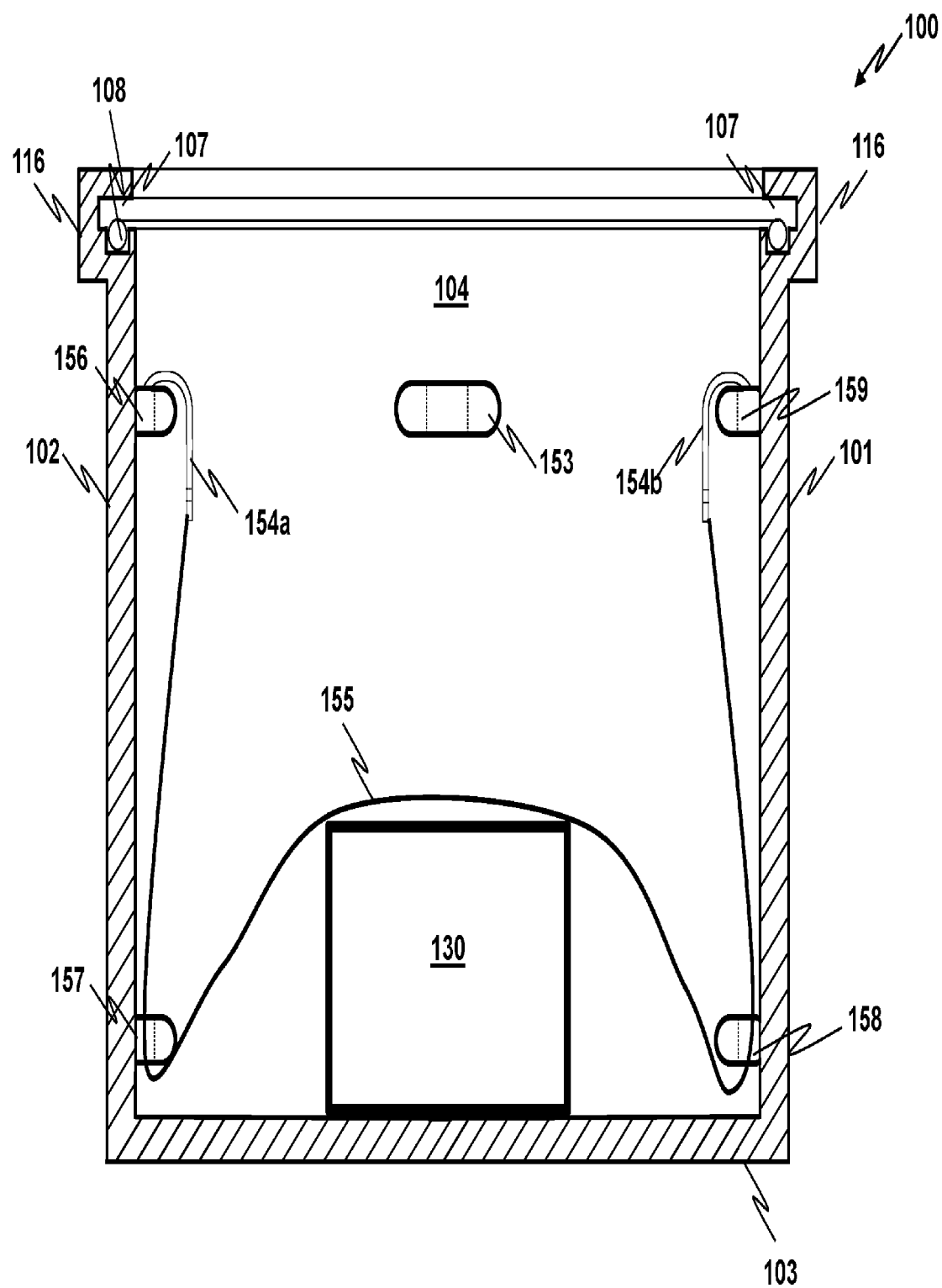
FIG. 8 is a cross-sectional, front view of a container in accordance with the present invention illustrating its use with an alternative package anchoring mechanism which employees one or more elastomeric cords.

It is noted, however, that the utilization of retaining elements 150, 151 and a 152 is not the only mechanism employable for purposes of positioning and anchoring package 130. However, the utilization of these retaining elements is preferable in embodiments in which automated processing is desired. In particular, attention is directed to FIG. 8 in which it is instead seen that elastomeric cord 155 is employed as an anchoring mechanism. In particular, in this embodiment, container 100 includes anchor loops 156, 157, 158 and 159, as shown. Elastomeric cord 155 is threaded through these loops and anchored at upper anchor loops 156 and 159, as shown by means of anchor hooks 154a and 154b respectively. Also seen in FIG. 8 is anchoring hook 153 disposed on backside 104 of container 100. While FIG. 8 only illustrates the presence of a single elastomeric cord extending from side to side in container 100, one may also deploy a similar cord extending from front to back, as suggested by the presence of anchor loop 153.

Figure 23:
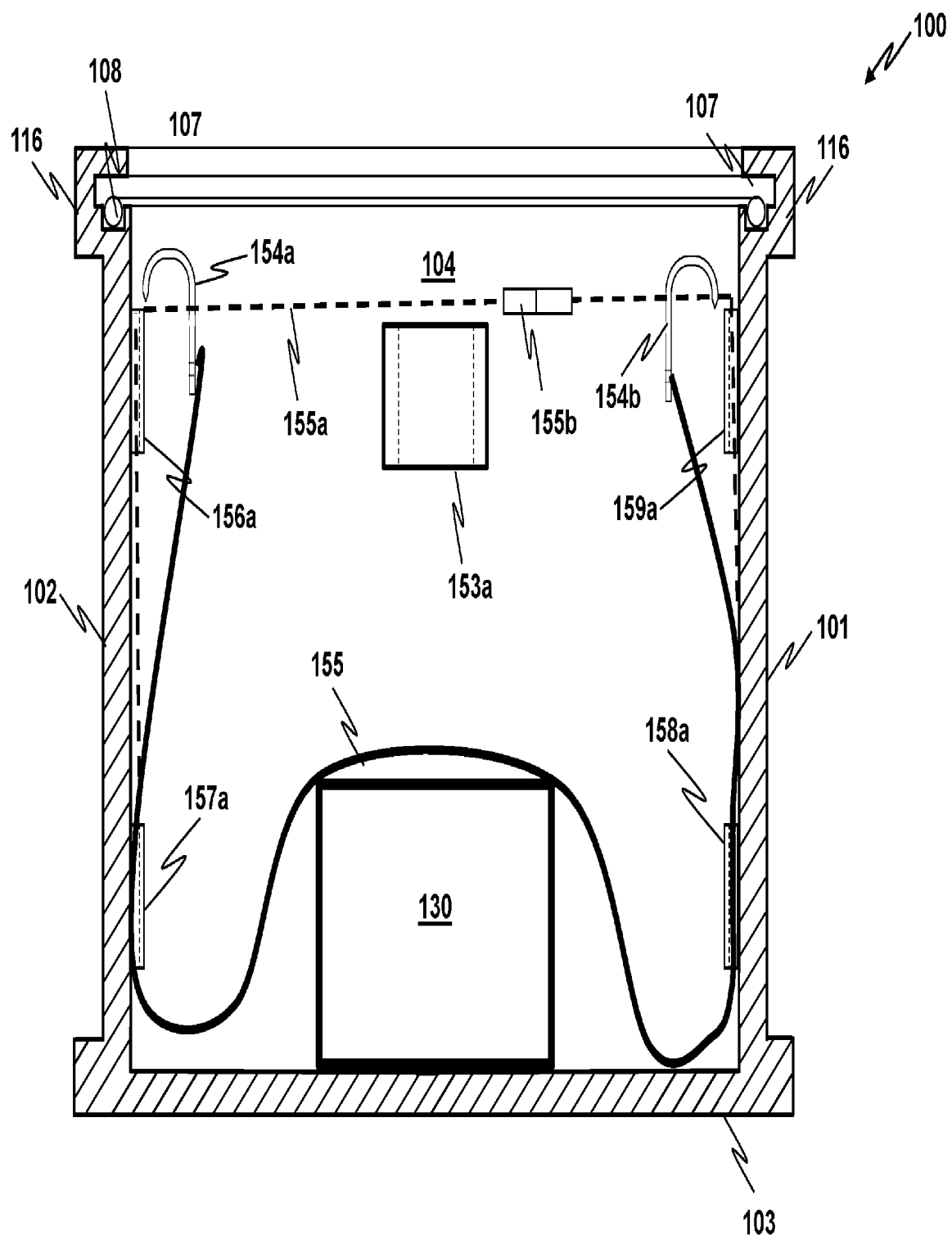
FIG. 23 is a cross-sectional, front elevation view of a container in accordance with the present invention illustrating two distinct methods for anchoring a package in place within the container.

It is also noted that some packages to be shipped are heavier than others. In such cases retaining elements 150, 151 and/or 152 are made of materials that are stiffer and thicker than otherwise. Likewise, for heavier packages intended for shipment, the use of elastomeric materials, as shown in FIGS. 8 and 23, should employ cords which also exhibit greater stiffness. Additionally, for such packages, a plurality of elastomeric cords is desirably employed.

Yet another embodiment of the present invention is illustrated in FIG. 23. This embodiment is similar to the one shown in FIG. 8 but employs stretchable belt material as opposed to a stretchable cord material. More particularly, this embodiment of the invention permits anchor loops 156a-159a which are flatter and which may be molded into walls 101 and 102 of container 100. Flexible belt material may follow a solid line and terminate in hooks 154a and 154b as shown. Alternatively, stretchable belt material 155a may follow the dotted path shown and terminate at bayonet buckle 155b. Again flatter loop anchor 153a is shown on back wall 104 of container 100 in order to provide product anchoring in the other direction. Is noted that other belt tensioning devices are known and may be employed. However, the utilization of elastomeric cords, elastomeric belts and or belt/cord tensioning systems, while employable and desirable in certain circumstances where package weight dictates sturdier anchoring, this makes automated anchoring less feasible. Therefore, for relatively lighter weight packages, anchoring using retaining elements 150, 151 and/or 152 is preferable.

In non-collapsible embodiments of the present invention, container 100 preferably comprises a polymeric material which is preferably sturdy, lightweight and constructed as a unitary structure with side 101, side 102, back 104, front 114 (see FIG. 15) and bottom 103. Container structure 100, again in some of its non-collapsible embodiments, also preferably includes slot 107 in a top portion in order to accommodate slidable top 110. Furthermore, in order to provide sealing against moisture and the elements, there is preferably provided, in embodiments having a slidable top, O-ring 108. O-ring 108 resides within a groove provided within the integral structure of container 100. Thus, in a state intended for shipment, the structure of the present invention includes, as discussed so far, container 100, top 110, O-ring 108, package 130 and retaining elements (150, 151 and/or 152). Tops other than slidable closure 110 are provided in other embodiments of the present invention. Collapsible embodiments of the present invention also preferably comprise a polymeric material which is sturdy, lightweight and in which the components comprise integral structures.

While container 100 and top 110 preferably comprise polymeric materials, typically those which are readily fashioned in molds, the present invention is not limited to such materials. In embodiments where security is important and in those embodiments where shipping weight is not of a significantly great concern, container 100 and top 110 may comprise a metal such as steel, aluminum or other metals or even wood or various composites. Such materials are desirable in those circumstances where package 130 comprises items of significant value such as gems or the like. In such circumstances security trumps waste and material limitations. Such considerations are discussed elsewhere herein.

Figure 2:
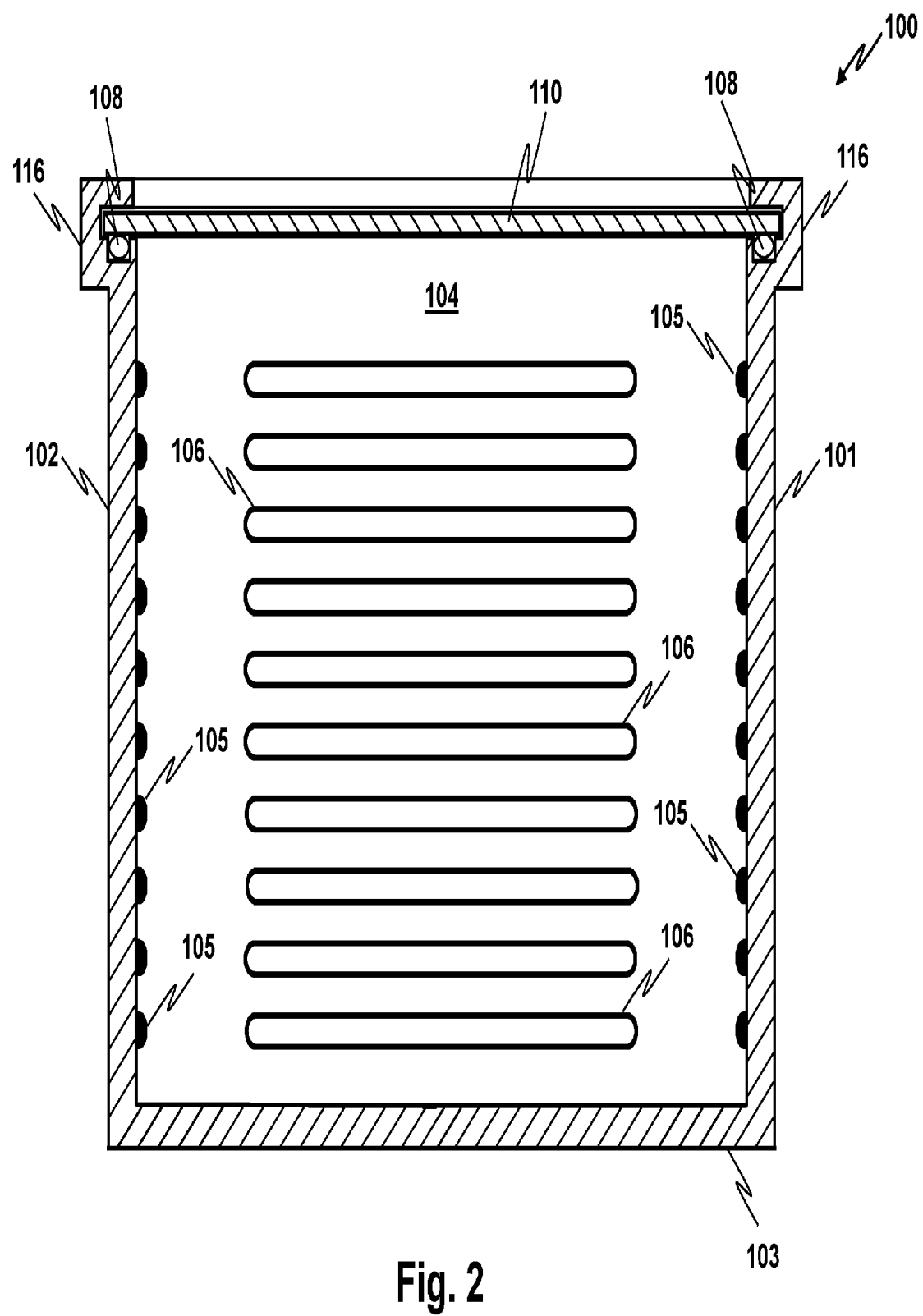
FIG. 2 is a cross-sectional, front view similar to FIG. 1 but which more particularly illustrates the utilization of a slidable top or lid.
Figure 9:
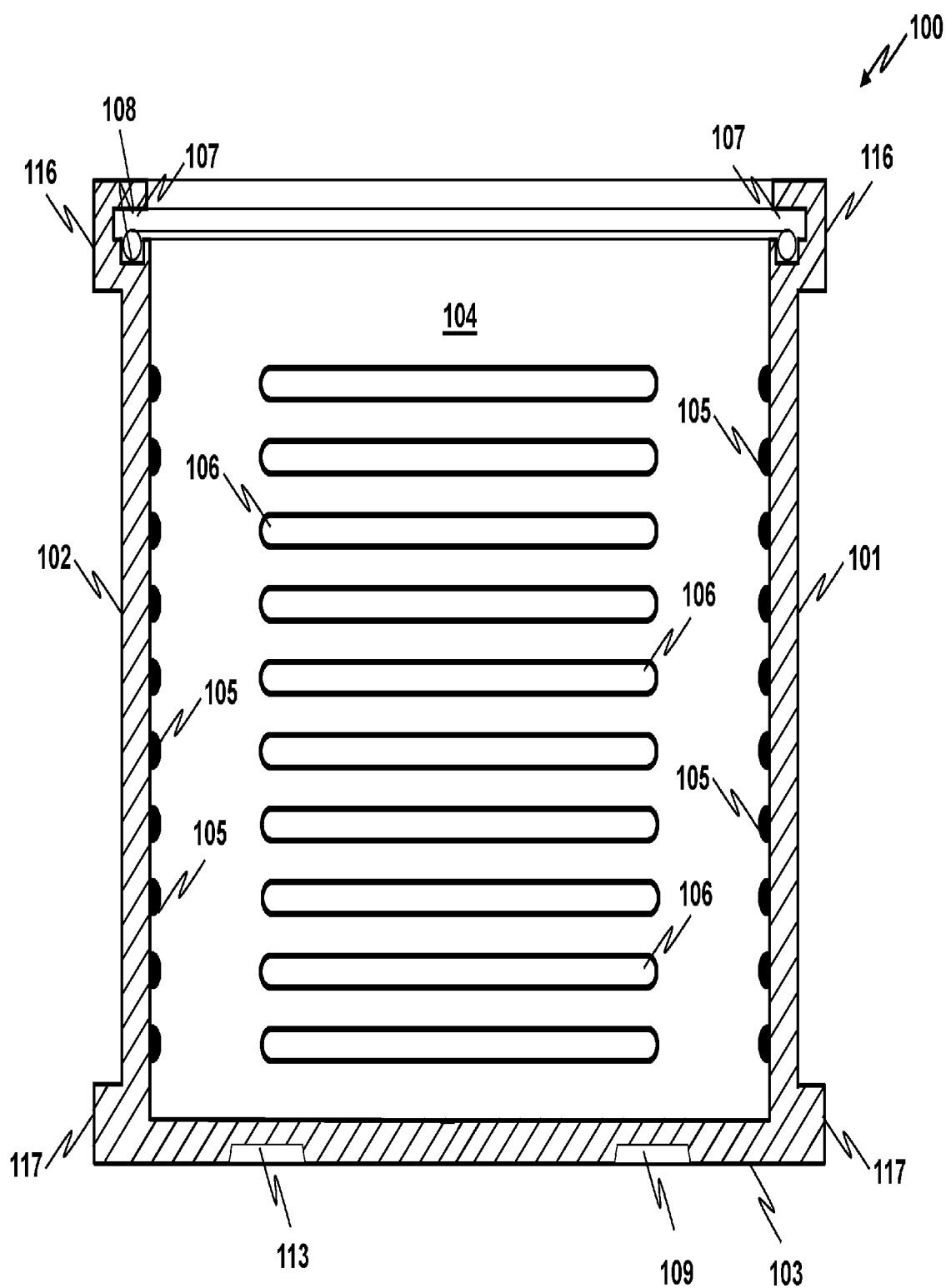
FIG. 9 is a cross-sectional, front view of a container in accordance with the present invention illustrating the presence of a sealing O-ring and also lower container flanges for improved stacking characteristics.

FIG. 2 particularly illustrates the utilization of slidable top 110 in conjunction with container 100. In particular, FIG. 2 illustrates the presence of slidable top 110 residing within slot 107 (of FIG. 1, for example). Also visible in FIG. 2 is O-ring 108. It is also seen, in FIGS. 1 and 2, that container structure 100 also includes upper frame portion 116 which may be employed with lower frame portion 117 (see FIGS. 7 and 9) to better improve stackability.

Sealing

Figure 4:
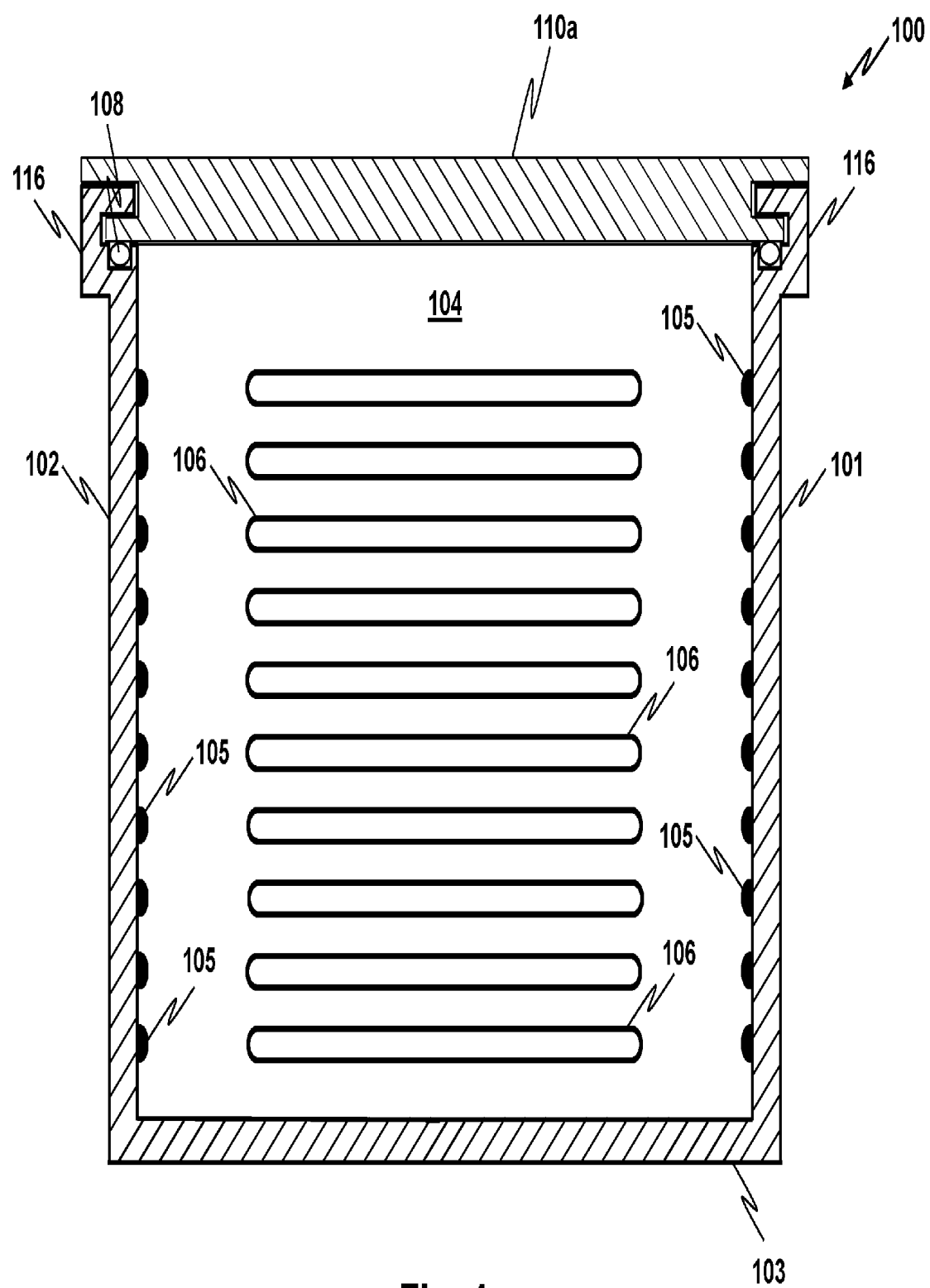
FIG. 4 is a cross sectional view similar to FIG. 2 but more particularly illustrating a slidable top enclosure which is also effective in preventing damage by weather and other elemental conditions, particularly water and moisture.
Figure 5:
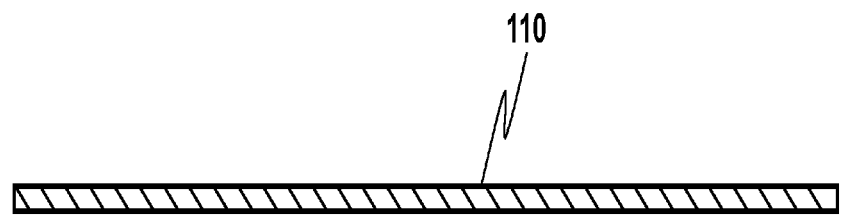
FIG. 5 is a cross-sectional view of a top or lid intended for utilization with the container of the present invention such as the one illustrated in FIG. 1.

As discussed above, it is well known that parcels to be delivered are sometimes left in the rain or in circumstances where rain or melting snow subsequently becomes an issue for package damage. Accordingly, it is seen above that, in such circumstances, it is desirable to provide a seal against the entry of rain, water, moisture or other elemental substances which can cause damage to or otherwise negatively impact the contents of the container. As seen above, one of the mechanisms for preventing such entry and damage is the presence of O-ring 108. Additionally, as seen in FIG. 4 it is also possible to employ top or lid structure 110a whose upper portion extends to frame edges 116 of container 100. Such a lid or top is necessarily thicker than lid 110 shown in FIGS. 1-3. However, it does provide greater protection against entry of damaging elements. It may be employed either with or without O-ring 108. With proper dimensioning, O-ring 108 may be eliminated, especially in dryer climates.

Additionally, it is possible to employ lid 500 such as is shown in FIGS. 26, 27, 28 and 29. This lid differs from the lids discussed above in two distinct aspects. First, it is connected to container 100 by means of hinge pin 506 (in FIG. 28). This means that, in this embodiment, one only needs one machine readable tag (e.g., a RFID chip) to achieve the purposes of such a chip. Second, lid 500 has sides that extend downward over the top edge of container 100. This also provides improved protection against rain and snow. However, with respect to the "built in combination lock" described herein, a minor modification is made in the positioning of lock assembly 550 so that lock bolt 201 now travels horizontally to extend through container aperture 502 and lid aperture 504 to provide a security function (see FIGS. 26-29). In other embodiments discussed herein, lock bolt 201 travels vertically (assuming the container is situated with its top end facing upward).

Figure 13:
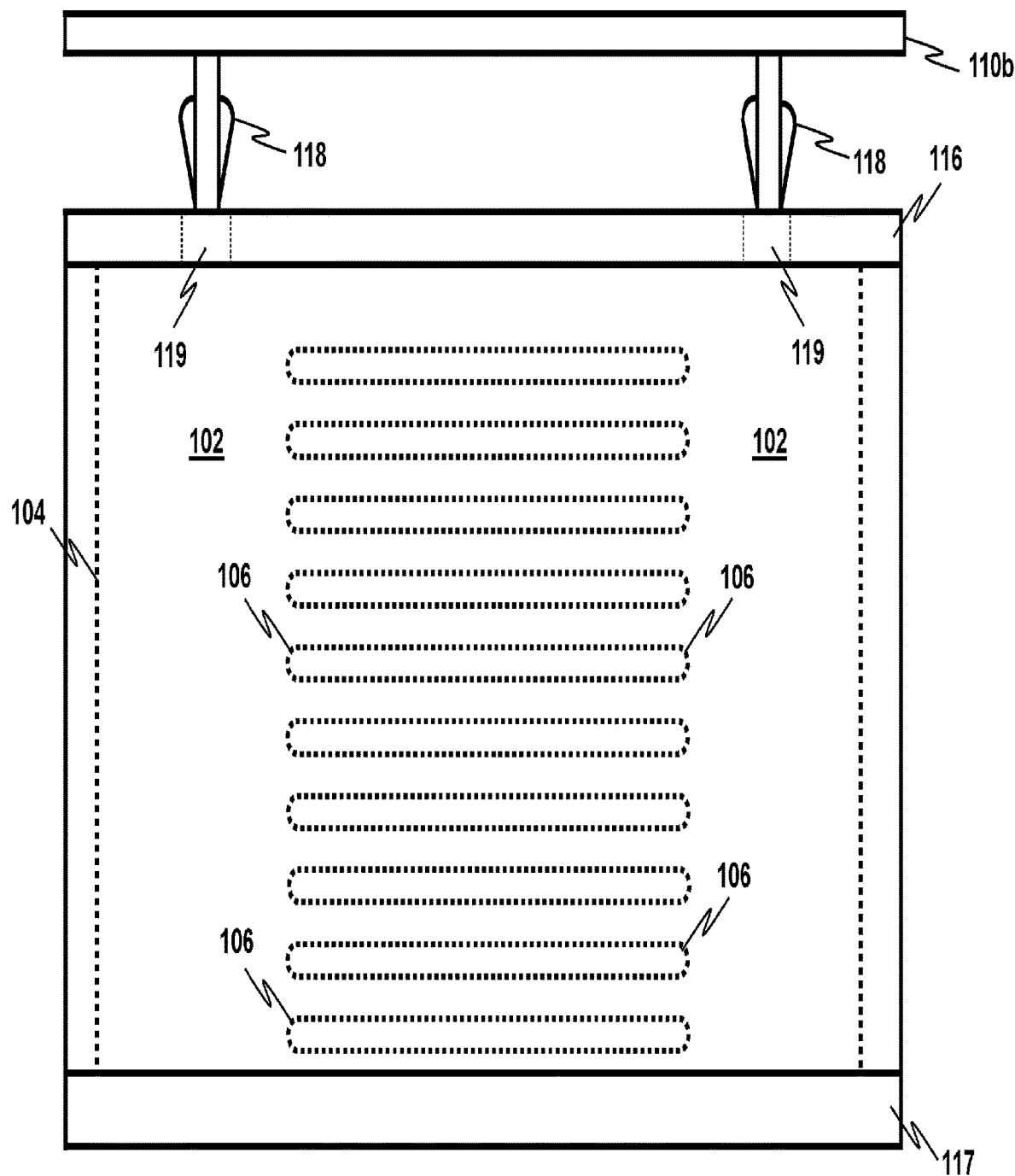
FIG. 13 is a side elevation view of a container in accordance with the present invention in which the top or lid is snapped into position as opposed to being slid into position.

It is also noted that other lid structures may also be employed in keeping with the scope of the present invention. In particular, is noted that lid 110b having squeezable tabs 118 which fit into slots 119 of upper frame structure 116, as shown in FIG. 13 may also be employed. In contrast to the slidable lids shown in FIGS. 1-4, the lid illustrated in FIG. 13 snaps into place. Lid 110b is dimensioned in a fashion similar to lid 110a shown in FIG. 4. Such a lid extends to the outer top edges of container 100. Furthermore, it is noted that lid 110b may also include side portions (not shown) that extend downward over the top of container 100. This provides yet another embodiment in which sealing against external elements is provided. In this regard, it is to be particularly noted that embodiments of the present invention in which sealing against external substances is provided represents an improvement over current packaging methods particularly in those circumstances in which protection against liquid intrusion is an issue.

Figure 6:
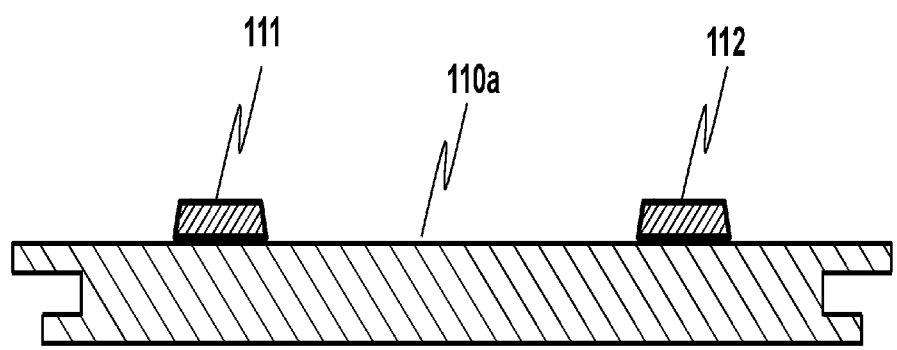
FIG. 6 is a cross sectional view of a top of the present invention such as that shown in FIG. 4 but more particularly illustrating the presence of raised portions intended to enhance stackability.
Figure 7:
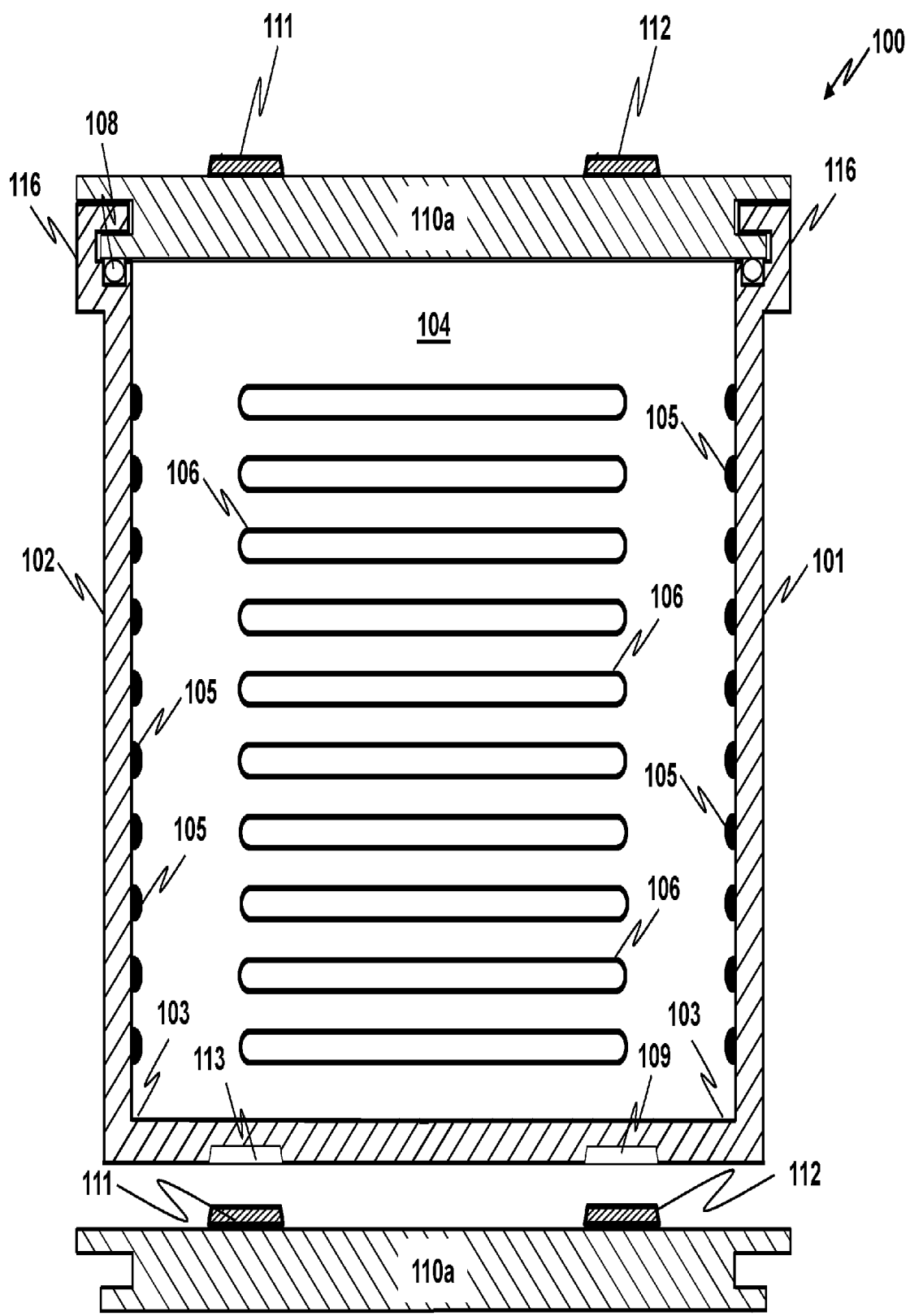
FIG. 7 is a cross-sectional, front view of a container and lid in accordance with the present invention particularly illustrating the presence of indentations on the bottom of the container which are intended to improve stackability.

The container of the present invention is also particularly amenable to the inclusion of structural elements and features which enhance the ability to easily stack the containers in a fashion which promotes stability against stacks being tipped over. These enhance both storage and transport. In particular, it is noted that top 110a in FIG. 6 may be provided with protrusions 111 and 112 which mate with corresponding recesses 113 and 109 respectively, as seen in FIG. 7. It is noted that protrusions 111 and 112 may also be provided as an integral portion of top 110a. It is further noted that it is not material that top portions are provided with protrusions as opposed to recesses or that bottom portions 103 are provided with recesses as opposed to protrusions. It is also of note that the particular shape of the protrusions or recesses is immaterial. Such mating portions for enhancing stackability are also providable in the shapes of top and bottom frame portions 116 and 117 respectively. It is further noted that protrusions and recesses may both be present on top structures such as 110 or as a featured shape in bottom 103 of container 100. All that is required is that corresponding protruding and recess areas physically align in a manner which inhibits side to side motion when containers of the present invention are present in a stack configuration.

Security

First of all, it is useful to define what is meant herein by security issues. In particular, this issue is concerned with both the prevention of a package from being tampered with during transit and/or with providing an indication that tampering has occurred. One of the objects of the present invention is to provide a transit mechanism which is at least as secure as currently available delivery approaches. It is, however, to be duly noted that no scheme or method is absolutely guaranteed to either prevent tampering or to indicate whether or not it has occurred. Security issues are addressed in FIGS. 15-19 and also in FIGS. 27 and 29.

Figure 14:
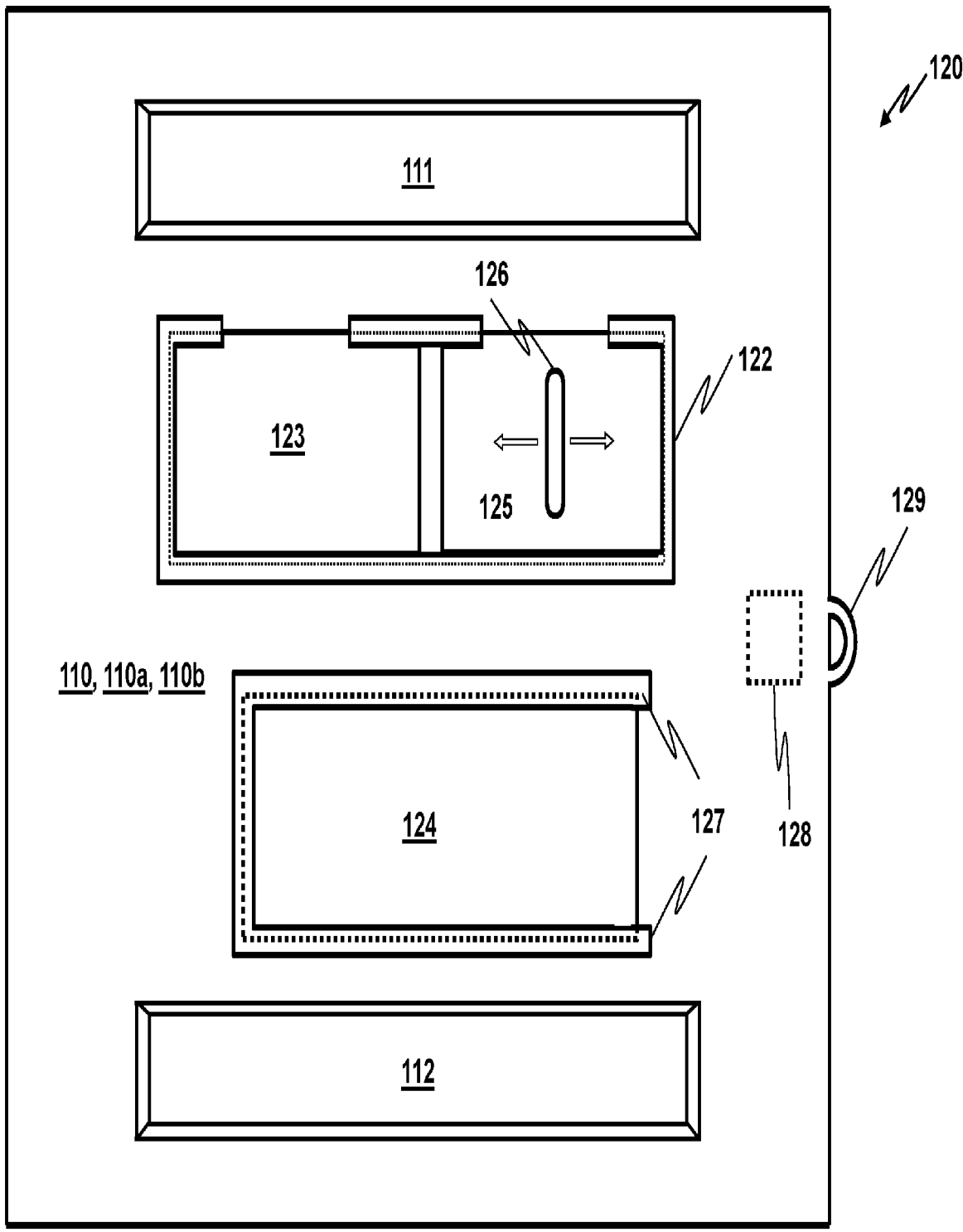
FIG. 14 is a top view of a lid or top intended for use in conjunction with the container of the present invention, the top or lid being particularly fitted with both human readable and machine-readable addressing portions together with a matching RFID chip or other machine readable information source.
Figure 15:
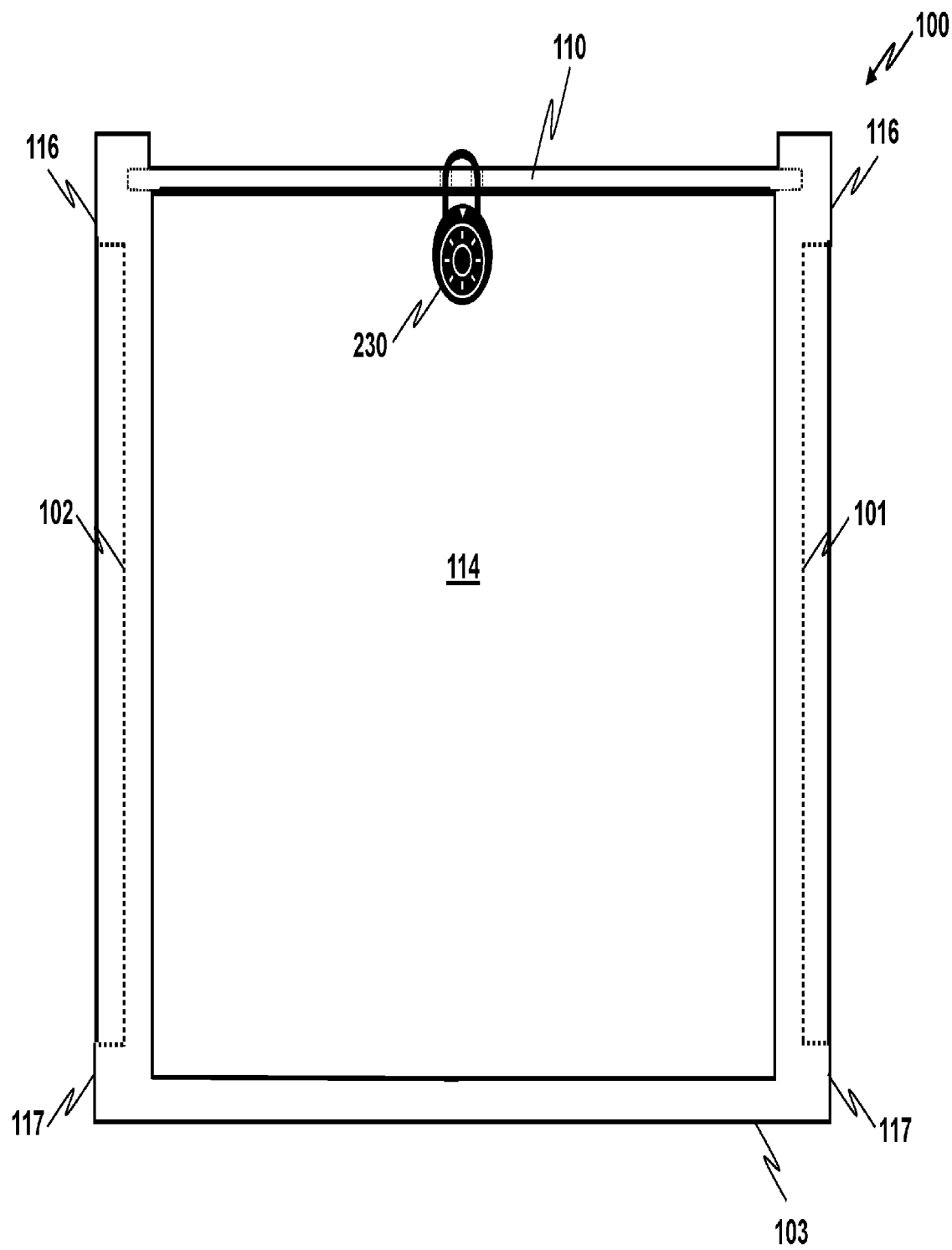
FIG. 15 is a front view of a container and top of the present invention fitted with a standard combination lock for those instances in which a greater degree of security in transport is desirable.

FIG. 15 illustrates a simple security mechanism in which a container of the present invention is provided with combination lock 230 which locks the top (in its various forms) to front 114. Loop structures are provided in both of these surfaces for the purpose of engaging the loop of combination lock 230. See, for example, loop 129 in FIG. 14. A matching structure is provided on front 114. Clearly lock 230, which may also include a standard lock with key, can be removed with a bolt cutter. Equally possible, loop 129 and its corresponding matching loop may also be severed with an appropriate cutting tool. The present invention does not protect against brute force methods of tampering. However, it is to be particularly noted that by providing a lockable structure such as that shown in FIG. 15, the level of security is significantly improved over any of the current delivery systems. It is also to be noted that the combination for lock 230 may be provided via an alternate delivery mechanism. For example, it may be provided in a separately mailed envelope. The combination may also be provided, via an Internet connection, especially in those situations in which an order for the package is initially placed via the Internet. If an actual physical key is employed, it too may be delivered (preferably beforehand) to the end customer via a separate route, such as via the US Postal Service. See comment elsewhere herein regarding 3D printing. Any lock is easily returnable (and should be) returned with the package.

For relatively small packages, a standard combination lock is in some circumstances overly cumbersome and potentially overly expensive. In such circumstances, and in others, it is also possible to secure the contents of the container using a "zip tie" (also known as a cable tie, hose tie, zap-strap or tie wrap). These ties are generally employed for organizing wires and cables and in a wide variety of other applications. The zip tie is passed through the same two loops as the aforementioned combination lock. Clearly, a zip tie is more easily severed than a combination lock. However, it is easy and desirable to employ a zip tie in which the name of the package sender is affixed or embedded. Unless the nefarious individual involved in severing the zip tie has a supply of replacement zip ties from the same source, there is provided at least an indication of tampering via the fact that the zip tie present on the package received does not bear the logo of the sender or other markings unique to the sender. A zip tie could also include a specially code RFID tag or a machine readable code.

Additional security measures along the same lines as the separately provided combination lock include the presence of the kinds of seals found on exterior gas and electric meters as a mechanism for both preventing and for indicating tampering. Devices of this kind are also advantageously employed in the practice of the present invention. In particular, such sealing tags include a loop. A first one of these locks is easily severed when the container is open by the recipient. A similar tag, provided by the sender for use by the recipient, is then used by the recipient to again lock the container for its return to the sender, especially in those circumstances in which the original package is included.

Figure 16:
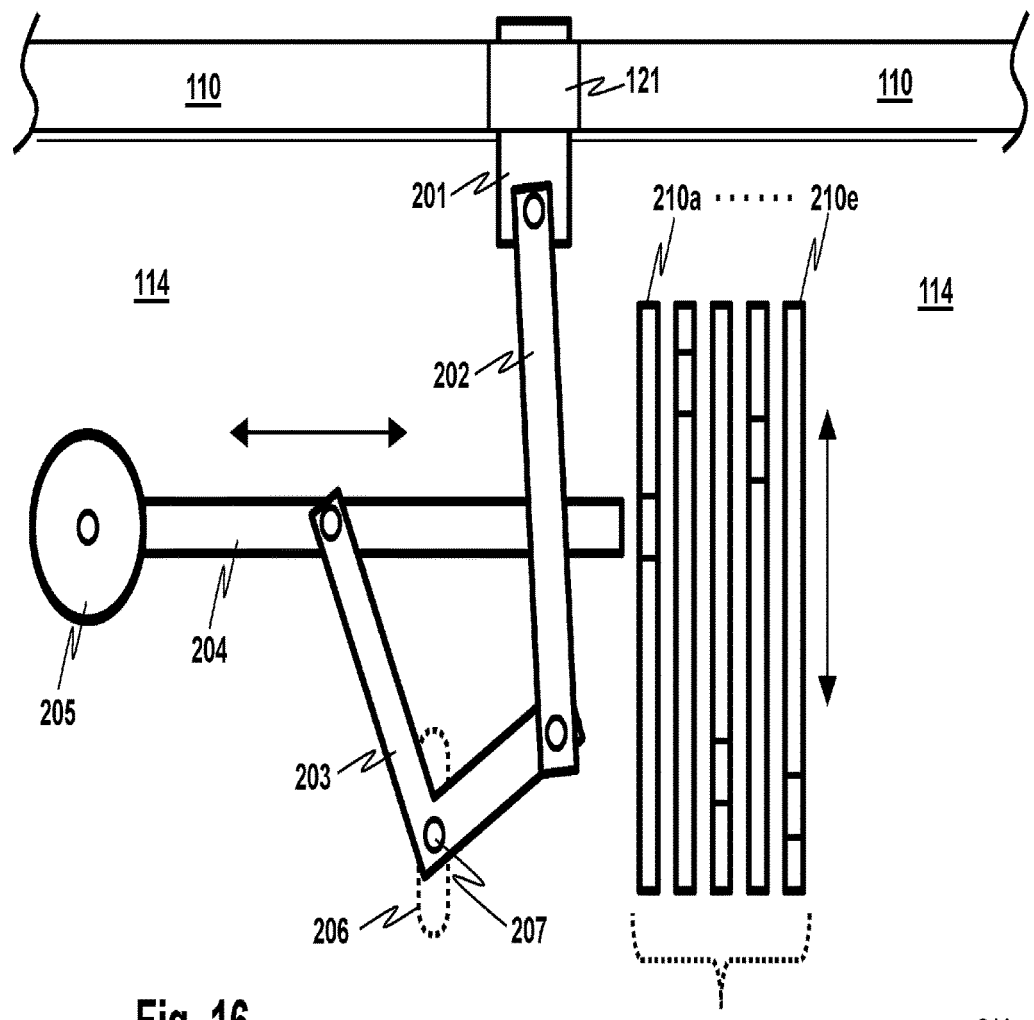
FIG. 16 is a front view of a combination lock which is particularly adapted for utilization with the present invention in that it is readily manufactured and installed and possesses a substantially flat design.
Figure 16A:
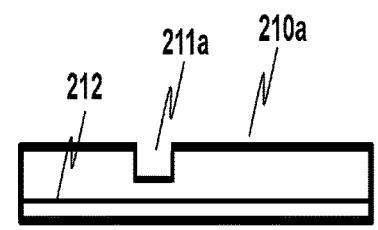
FIG. 16A is a side elevation view of a slidable "tumbler" used in the relatively flat combination lock illustrated in FIG. 16.

Since front 114 of container 100 is relatively flat, it is also possible to build into that structure a correspondingly flat combination lock that is an integral component of container 100. A simple embodiment of such an embedded combination lock is shown in FIG. 16. As shipped, bolt 201 is disposed through opening 121 in top 110. This prevents removal of top 110. Linking rod 202 connects bolt 201 to bell crank 203. Bell crank 203 is affixed in slot 206 in front 114 via shoulder pin or rivet 207. In turn, Bell crank 203 is affixed at its other end to slidable rod 204 which is attached to knob 205 which is externally accessible to a user (preferably the package recipient) for the purpose of being able to move slidable rod 204 through an array of slidable "combination determination" elements 210a-210e, as shown. However, unless these combination defining elements are appropriately aligned, it is not possible to move slidable rod 204 to the right in order to remove bolt 201 from slot 121. However, if the combination defining elements are slid into a position which aligns openings 211a (see FIGS. 16A and 16), slidable rod 204 is movable to the right through these openings, thus turning bell crank 203 and removing bolt 201 from slot 121. Although not visible, for reasons of clarity, slidable combination defining elements 210 also include lower lips 212 which slide within slots provided on the interior of front 114. In short, when openings 211a-211e are aligned, top 110 is freed to be removed. Clearly, slidable combination defining elements 210 are provided with numeric, alphabetic or alphanumeric indicia visible to the recipient on the exterior of front 114 and designate the position of that slidable element. When slidable elements 210 are correctly positioned, as determined by a separately provided alphanumeric key, the top is removable and the package may be extracted. For purposes of providing a clearer understanding of the relation between the described combination lock and the rest of the container, see FIG. 17 which shows the relation between all of the relevant components. In the further description below, it is desirable to refer to the combination lock as a unitary assembly. This assembly is denoted by structure 550, as shown within the dashed line. In general, the present invention is employable with any lock structure which, with the right "key" being supplied, is capable of moving bolt 201 into and out of a corresponding opening such as slot 121. The "key" is either an actual physical key or an alphanumeric combination. Any lock which functions to move a bolt into and out of an opening is employable with the present invention, though clearly, flat lock structures are preferred. Similar unitary lock structure 550 is shown in FIGS. 18 and 19 which are discussed in more detail below.

It is noted that the mechanism illustrated in FIG. 16, although usable, suffers from a significant drawback in that nefarious individuals can use slidable rod 204 in conjunction with sliding the combination determining elements starting from the one on the left as a mechanism for probing the location of openings 211. Repeated probing in this manner renders it possible to open the container without foreknowledge of the combination.

Figure 17:
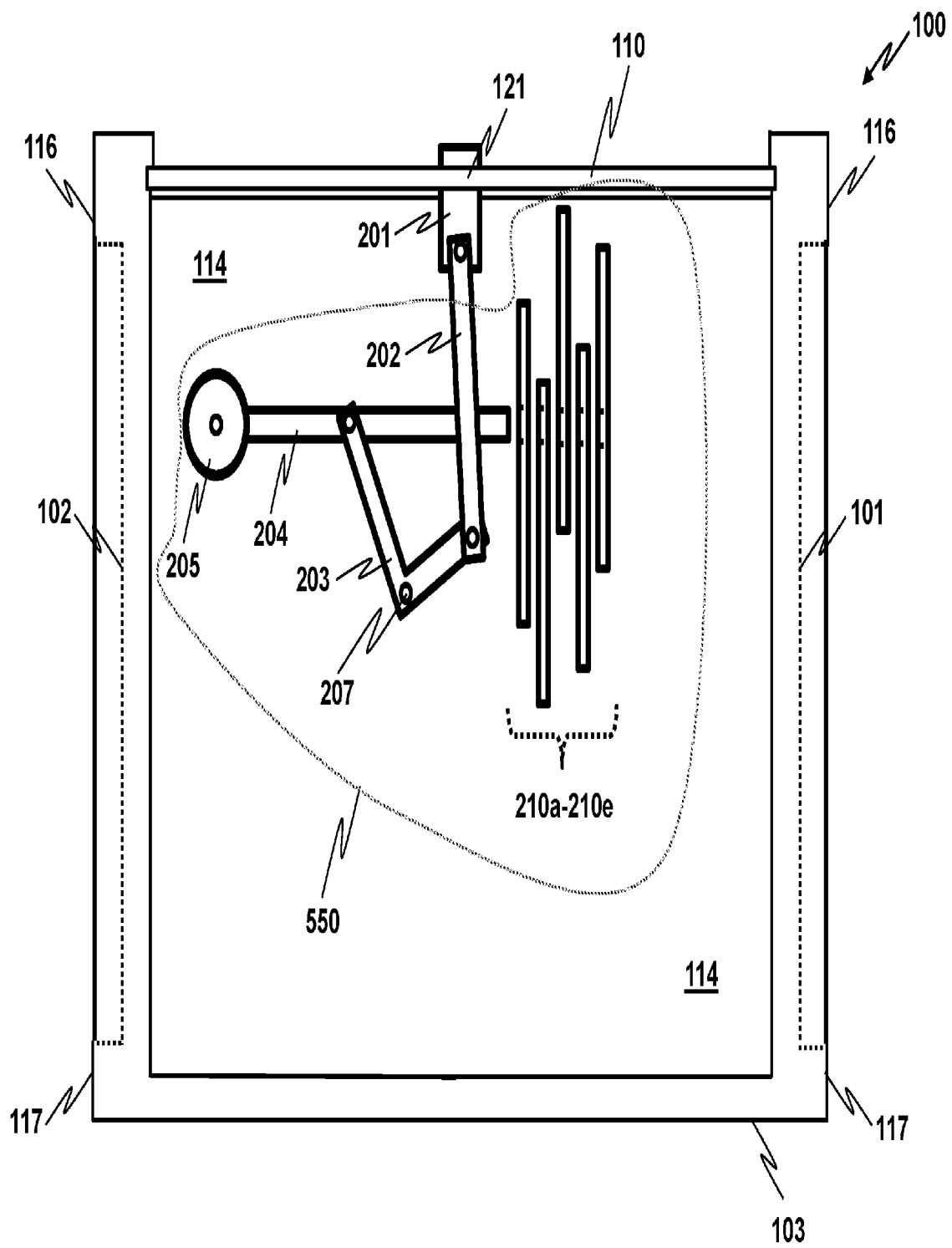
FIG. 17 is a front view of the combination lock of FIG. 16 shown in the context of its intended utilization.
Figure 18:
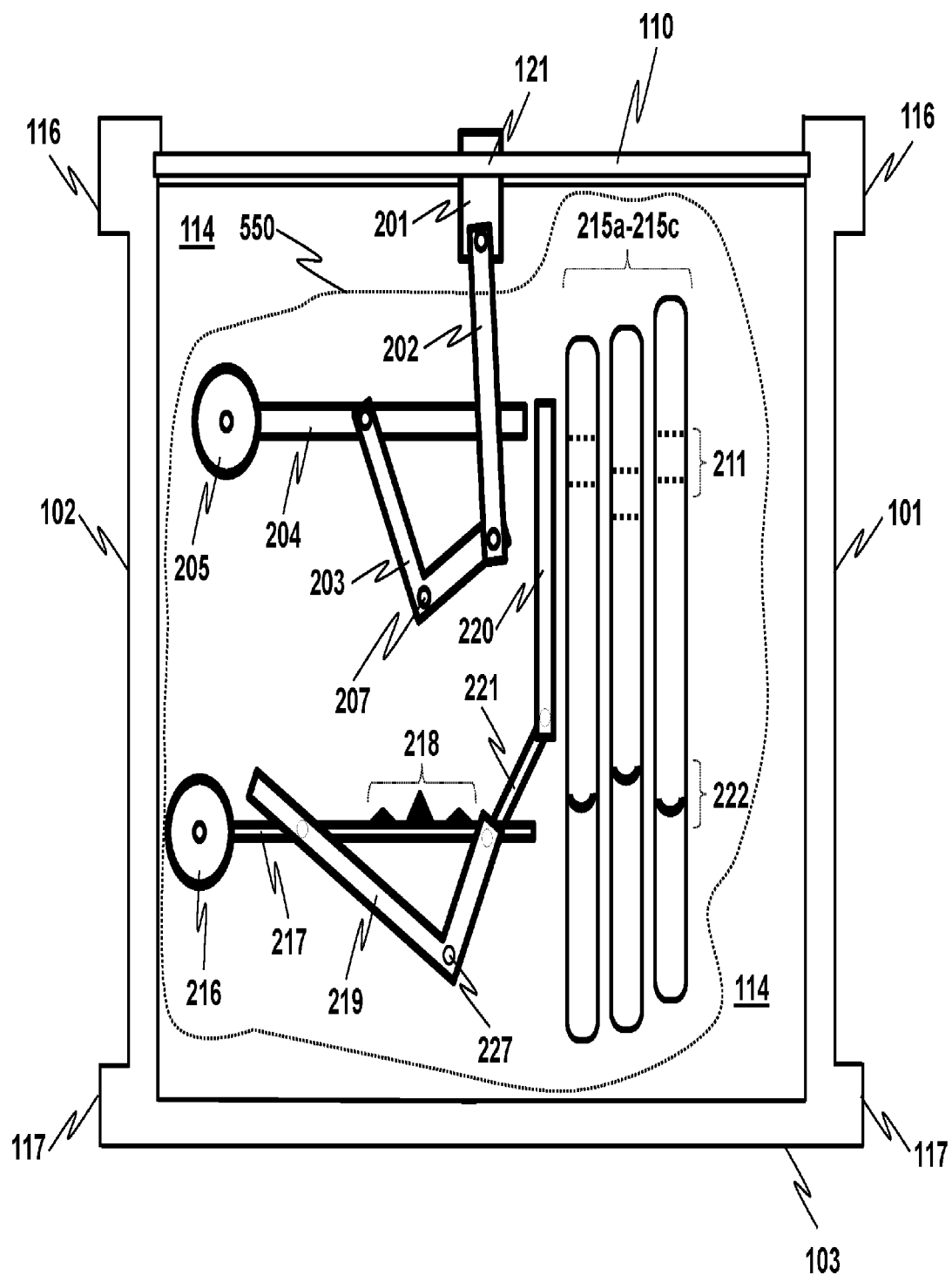
FIG. 18 is a front view of an alternate combination lock that is also relatively flat and usable with the container of the present invention, this particular combination lock design being more secure than that shown in FIG. 16.

An improved combination lock is illustrated in FIG. 18. This locked structure incorporates the structure described above but it includes barrier 220 which prevents slidable rod 204 from being used to probe for openings 211. In this improved combination lock structure, it is first necessary to move barrier 220 through the action of linking rod 221 which is connected to second bell crank 219 which is affixed to front 114 in the same manner as crank 203. In a similar arrangement to the lock structure discussed above, bell crank 219 is connected to second slidable rod 217. Rods 204 and 217 slide in grooves (on the interior) in front 114 that, for reasons of clarity, are not shown. Movement of slidable rod 217 to the right using knob 216 requires that slidable combination defining elements 215a-215c are first moved into a position which is matched to key structure 218 on slidable rod 217. When slidable combination defining elements 215 are moved into a position defining the required combination, it then becomes possible to move slidable rod 217 to the right to engage "tumblers" 222 which thus acts to urge combination defining elements 215a-215c to a final position in which openings 211 are aligned and which therefore allow slidable rod 204 to pass therethrough. It is noted that those viewing a container employing such a combination lock structure see only knobs 205 and 216 and exterior portions of defining elements 210 or portions of slidable combination defining elements 215 having appropriate combination defining indicia thereon. To be clear, one must know how to position slidable elements 215a-215c at the outset in order to be able to move rod 217. It is also noted that, while FIG. 17 illustrates the utilization of a total of five slidable combination defining elements, for purposes of clarity FIG. 18 illustrates a lock having only three such slidable elements. Any reasonable number may be employed.

Figure 19:
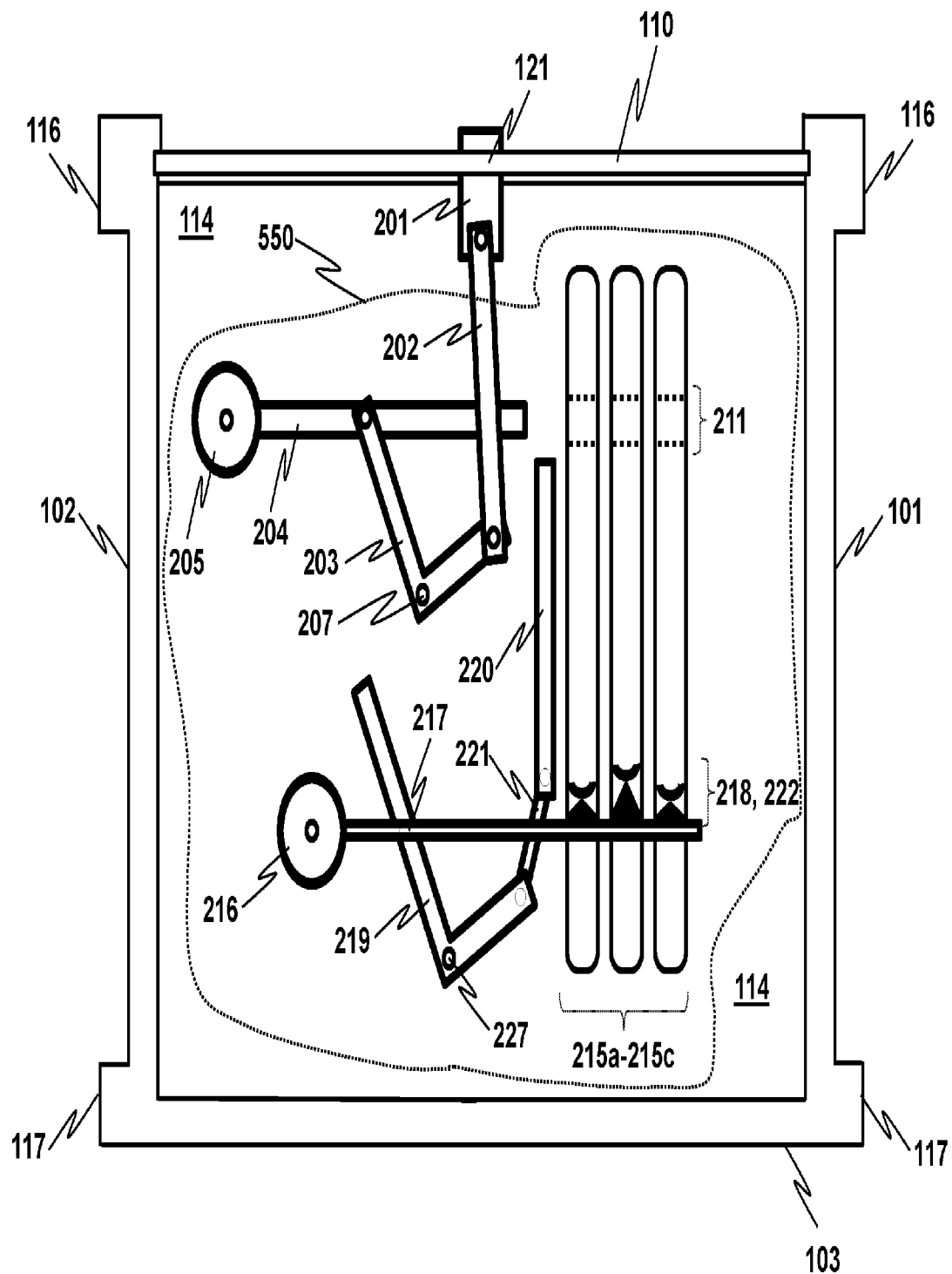
FIG. 19 is a front view similar to FIG. 18 but more particularly showing the combination lock in a position in which the slidable "tumblers" are pre-aligned and adjusted into a final position by the key structure illustrated.

For an even better understanding of the operation of the improved combination lock illustrated in FIG. 18, FIG. 19 is provided. In this figure, slidable combination defining elements 215 are shown as being moved into a position associated with a desired combination. Knob 216 is then used to urge rod 217 to the right so that key elements 218 engage "tumblers" 222 which thus finally position openings 211 so that knob 205 is then movable to the right thus removing bolt 201 from slot 121.

It is noted that the description of the combination lock in FIGS. 16 through 19 is not necessarily intended to reflect in all instances the usage of terminology that might be employed in the "lock arts." In such cases, it is the intent hereby to assert an applicant's right to be his/her own lexicographer.

It is noted that there are additional ways to reduce the likelihood of tampering or to provide an indication of its having occurred. These mechanisms are well known in the art and include specially designed seals that are affixed between top 110 and container 100. Such seals are typically affixed to packages or other devices using an adhesive which is sufficiently strong so that attempts to remove the seal destroy it. Additional mechanisms employing various electronic devices and configurations for indicating for example, how many times the container has been opened, are well known and are also employable with the present invention and its various features.

Addressing

The issue of providing container 100 with an appropriate indication of a destination address is complicated in the present context in which it is desired that container 100 be returned to a source. In this regard, it is noted that container 100 may be returned to a source-owned facility at a location other than that from which it is sent. This is particularly the case when merchandise, which is intended to be returned, goes to a separate location which is dedicated to the receipt and processing of returned goods. Accordingly, there are those instances in which there are, in fact, three separate addresses that may be associated with a particular container during its shipment and return. One should also consider the fact that, as much as possible, automated tracking and handling of a shipped container is desired. Accordingly, it is seen that it is desirable to be able to accommodate both human readable and machine readable addresses. While it is possible to deploy addressing information on one or more of the sides of the container, use of the top is the most natural choice for carrying out this function.

One solution to this problem is illustrated in FIG. 14, which is a top view of container top 110, 110a, 110b or 500 referred to in this particular figure by reference numeral 120 because of its specific relation to issues of addressing. In particular, top 120 may include elevated strips 111 and 112 to improve conditions of stackability as discussed above. Top 110 or 120 also preferably includes machine readable information (e.g., RFID chip 128). Matching RFID chip 138 (or tag) is visible in FIG. 10. RFID chips (or the like) have the advantage of being readable by machine from within a few feet away. In embodiments of the present invention in which the lid is detachable from the rest of the container, two chips are used to insure common processing.

The RFID chips are employed in the present invention for the purpose of storing information that is unique to the container in which it is employed. This information includes physical properties of the container such as its dimensions, its weight and the maximum weight it is intended to carry. It may also include other "permanent" information such as a serial number, model number, data of manufacture, manufacturer and, if necessary, its intended purchaser. In any event, the chip is intended to be permanently affixed to the container, either by being embedded in in or secured to the container by a firm adhesive. Other reasons for employing RFID chips are discussed below with respect to the issue of return postage.

With particular reference to the issue of addresses, it is noted that there are two such areas, but it is not necessary that both areas be used at the same time. One of these areas is devoted to addresses which appear in human readable form. These addresses are preferably visible through a transparent portion of the top. The other area is devoted to addresses which are readable by machine. Machine readable addresses are found in two possible locations. They may be found in the RFID chips or they may be found in machine scannable bar codes visible through a transparent window in the top (110a, 110b or 110c in FIG. 14 or 500 as seen in FIGS. 26-29). In addition to the information listed above for inclusion in an RFID chip, it is also possible to include an address to which the container is always intended to be returned. This information is also providable on a printed medium in the form of a machine readable code, such as the QR code, which is visible from a view of the top, sometimes through a transparent window which protects the information on the medium from being tampered with.

The machine readable areas preferably employ two-dimensional barcodes because of their greater information density in terms of bits per square inch. However, the particular machine-readable code employed is ultimately a matter of design choice.

A human readable address is preferably provided on a relatively stiff piece of paper or the like (also referred to herein as a medium) and is intended to be slid under transparent window 124 which is held in place by ridge structures 127 on top 120. Machine readable addresses are likewise provided on relatively stiff media and are slid underneath ridge structures 122. Ridge structures 122 also include opaque slidable portion 125 which is used to indicate the currently intended address destination.

In one embodiment of the present invention, the address portions shown in FIG. 14 are used in the following manner. The sender includes a human readable original destination address beneath transparent window 124. On the opposite side of the medium for this address, there is a sender selected return address provided in human readable form. Likewise, the sender also includes machine readable address 123 held in place by means of raised ridge portions 122. In a first position, slider 125 renders visible this original destination address in machine readable form. For purposes of return, slider 125 is moved to its opposite position so as to render visible a return address in machine-readable form. Slider 125 engages ridges 122 at its extreme positions in a manner which firmly locks slider 125 into position. Anchoring slider 125 in the manner indicated prevents inadvertent movement of slider 125 during transport. In this manner, it is seen that the sender is initially responsible for issues of addressing. In particular, it is noted that the construction of machine readable information containing desired addressing data is most easily providable by a retail sender or manufacturer.

In a generally anticipated course of the transportation process, an end user receives package 130 within container 100. Return of container 100 is effected by flipping the human readable address label under window 124 and placing it back in the window with a return address showing. Likewise, in order to provide a machine-readable return address, slider 125 is moved to its opposite position. It should be noted, however, that the mechanisms provided herein for display of human readable and machine readable addresses may be interchanged. In particular, human readable addresses may be provided in a suitably sized display switched using a slider such as 125. Likewise, machine-readable addresses may be provided beneath a transparent window and flipped to show a return address on the opposite side of the medium (paper, cardboard, plastic or the like, in short, any medium capable of being impressed with the desired information with heavier duty media, even metal, being employed in situations in which packages are exchanged on a repeated basis between the same two parties). It is also in keeping with the present invention to generally employ both kinds of address information visible upon viewing the container top.

It is also to be explicitly noted that the issue of addressing plays a role in the next issue to be discussed namely the provision of a method for eliminating stamps and the like in the transportation of packages within containers of the present invention.

Postage Issue

The standard methods for assuring that a parcel has the appropriate amount of "postage" fall into three general types: (1) affixing stamps or some other form of (U.S. Postal Service or other transporter) issued label to the package; (2) pre-paying the shipping costs either directly (usually per item) or indirectly via contract; and (3) guaranteed return postage agreements. However, when the packaging is intended to be returned to the source (or to another specified destination), three issues arise. The first and foremost is the method of payment for a return trip. The second is how one affixes an appropriate indicia of payment. The third is the fact that, when the container alone is to be returned, its weight is different and the shipping cost should therefore be lower.

Figure 28:
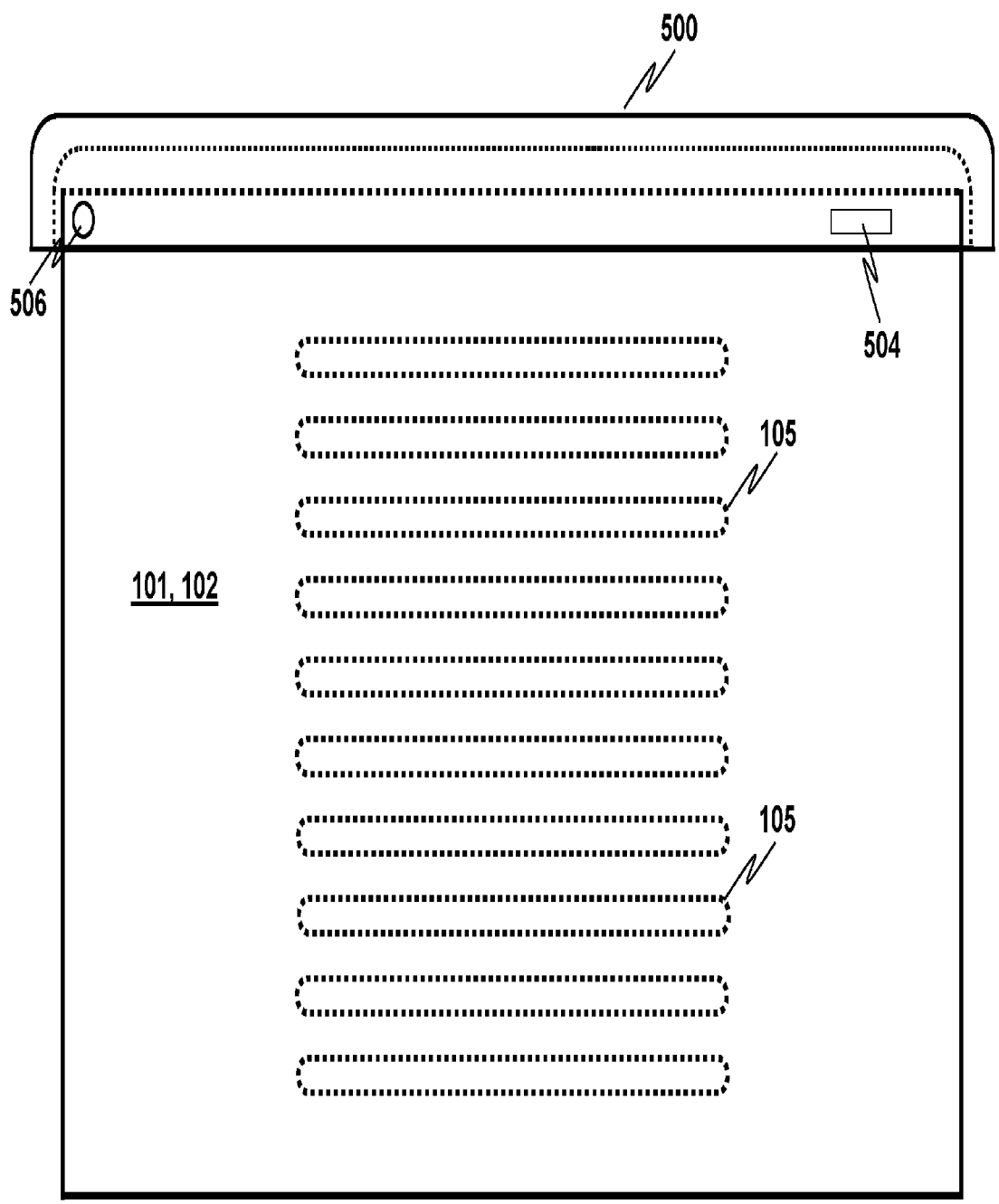
FIG. 28 is a side, elevation view of a shipping container with a rain resistant cap or lid which is hinged at the top, back of the container.

Stamps and other postal indicia are usually affixed to the package in a relatively standard position. It would appear that one of the requirements is placement on the same side of the package as the address. This is logical whether or not the package is being delivered by a sovereign postal authority or by a private carrier. If the packaging is intended to be reused, as is the intention but not absolute requirement of the present invention, multiple affixations of postage or other such labeling to the outside of the container would eventually become problematic as multiple layers are built up, one upon another. A possible solution would be to provide a recessed area on the cover (lid) into which a proper payment indicia (stamps or postal label, for example) could be inserted. If the lid is detachable from the container, the slot/pocket/recessed area is preferably provided on the exterior of the lid. However, such an area is not particularly secure. If the lid is affixed to the container, as by a hinge as shown in FIG. 28, the slot/pocket/recessed area is preferably disposed on the underside of the lid which includes a transparent window through which both human and machine readable addresses are perceived.

One of the options available is to simply scrape off any previously affixed "postage" (and, by "postage" here and elsewhere is meant any indicia of payment provided for transport and/or delivery). This obviates the issue but is inconvenient, time consuming and messy. Accordingly, the present invention also contemplates a system in which "postage," as such, is not even required.

One solution is found by providing each container with an RFID chip (or chips, as hereinafter discussed). Information read from the chip (or other machine readable indicia, though preferably an RFID chip) is associated with a time and date to create a unique transaction code which is associable with an indication of proper payment. The time/date stamp information is encoded in machine readable code on a medium viewable on or through lid 110a, 110b, 110c or 500. This medium is intended to have two sides: a first side for use on transport from a source; and a second side intended for return to a/the source. As mentioned elsewhere herein, the return address may vary, as for example, goods are to be returned as opposed to only returning the container. When RFID chips are employed it is possible to provide not only an indication of two distinct return addresses, depending on purpose, but also to indicate which address is to be employed. For example, in most instances of return, the return address is provided in the RFID chip. However, in the case of a merchandise return, the medium, which is initially provide by the original shipper, has a second side (see above) which contains both machine and human readable address information. Simply by flipping over the medium and reinserting it in its pocket, the end user has created a container ready for return. The shipping source can also supply a printed medium for a separate medium insert that is intended for the return of goods, rather than the container by itself.

Figure 10:
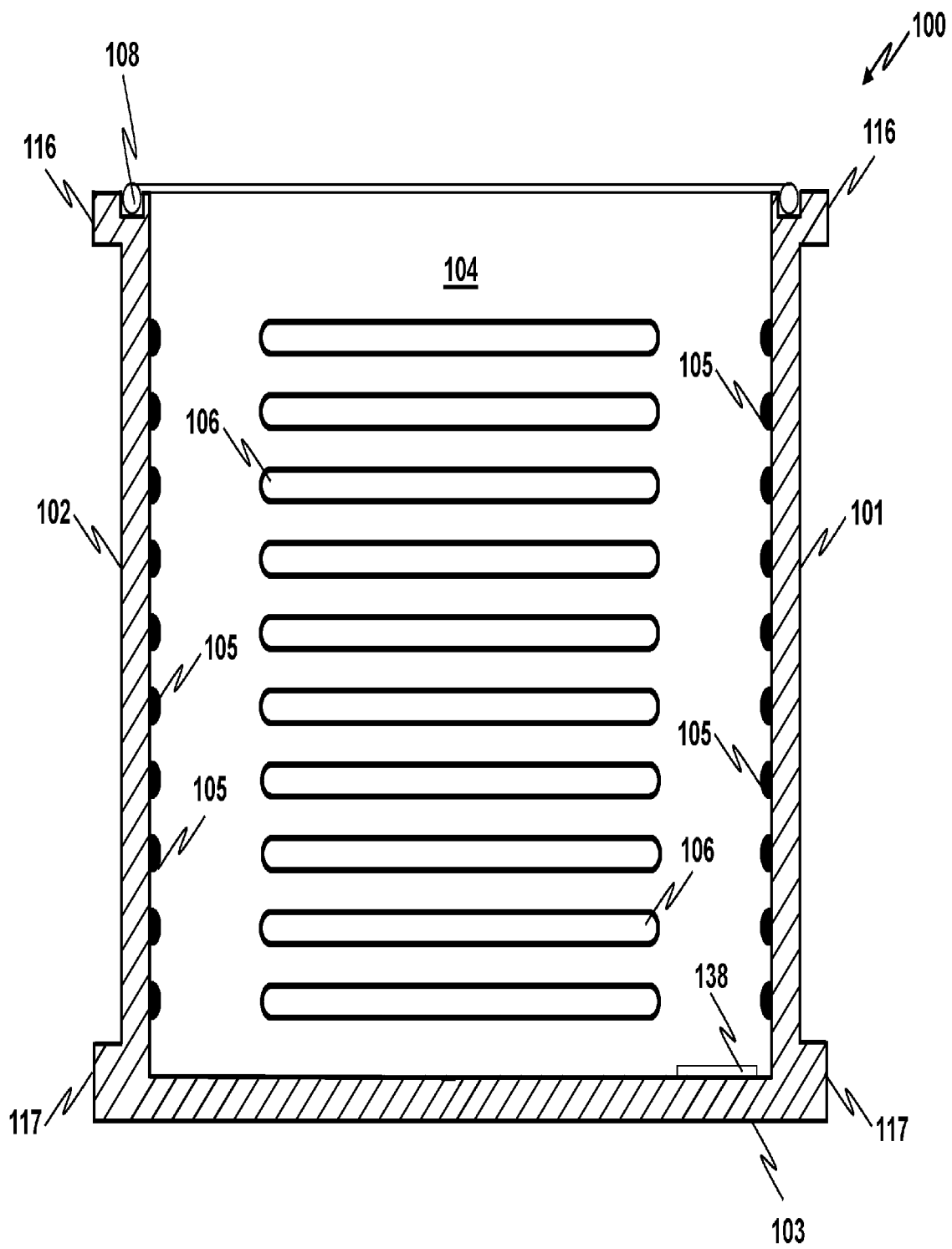
FIG. 10 is a cross-sectional, front view of a container in accordance with the present invention which particularly illustrates a placement position for an RFID or other tag.

The issue of postage, payment and processing is addressed by the utilization of two separate structures incorporated in the container of the present invention. The first such structure is the incorporation of RFID chip 138 in container 100 as shown in FIG. 10 and matching RFID chip 128 incorporated into top (110, 110a, 110b, 120 or 500) as shown in the figures. A second structure for postage payment and processing is addressed by the inclusion of machine-readable address information visible in structure 122 also shown in FIG. 14 and in FIG. 29.

As indicated above, it is one of the purposes of the present invention to provide a shipping container which makes positive environmental contributions in that: (1) containers of the present invention are continually recycled back to their sources for reuse thus reducing or eliminating the need for the continued manufacture and production of cardboard boxes and the like; and (2) containers of the present invention do not require the utilization of disposable packing material to provide transport buffering. The elimination of transport buffering (filler materials) also helps in reducing overall costs. However, these advances do not occur without the added cost of returning the container to a source. It is, however, noted that ground transportation between sources and destinations occurs on a regular basis, thus mitigating costs associated with return transportation of the container. Nonetheless, because of this increased cost it becomes that much more desirable to provide automated handling procedures which operate to reduce transportation costs in both directions both for the container and/or for any package that may be contained therein.

In a certain sense the issue of return postage is already solved. There already exists a system for the return of merchandise to a seller. In such instances, the seller and/or shipper provides what is referred to as a RMA (Return Merchandise Authorization). According to Wikipedia an RMA is: "a part of the process of returning a product to receive a refund, replacement, or repair during the product's warranty period. The purchaser of the product must contact the manufacturer (or distributor or retailer) to obtain authorization to return the product. The resulting RMA or RGA number must be displayed on or included in the returned product's packaging . . . " The only aspect that is added by the present invention is that such an authorization is included within the package from the start. However, the authorization is indicated as being a return only of the container not of the package. This is indicated in the machine-readable code present on the printed medium.

An important step in automating container handling is the utilization of one or more RFID chips permanently affixed to the container (and/or its top). One of the important pieces of information contained on these RFID chips is a unique serial number. When a container is presented to a delivery entity 400, there is then generated a unique signature for the shipping transaction. This signature comprises a combination of the unique container serial number together with a time and/or date stamp. This provides a unique identifier which is associated within data storage facility 410 belonging to delivery entity 400 (which is often the same as the merchant/manufacturer). At the time of presentation for delivery to delivery entity 400 payment is made transferring funds from a sender to the delivery entity. This transfer of funds may also be accomplished in an automated fashion. The relevant fact is that, in the delivery entities there is a database, associated with the unique signature and an indication of the fact of payment along with an indication of the amount paid. However, inclusion of the precise amount is not essential to the process of delivery facilitated by the present invention. The delivery entity may comprise the US Postal Service, UPS, FedEx, DHL or any similarly functioning person or corporation.

Since container 100 may be separable from top 110, it is desirable to ensure that the container portion containing the package to be delivered is continually associated with the unique signature and indication of payment. The signature plus indication of payment residing in data storage facility 410 of delivery entity 400 is employed throughout the transport process to continually assure that "proper postage has been paid." Accordingly, in embodiments of the present invention in which the lid is removable, containers herein preferably include two RFID chips, as illustrated above, together with an indication therein as to whether the chip is affixed to top 110 or container 100. It is, however, to be noted that the utilization of dual RFID chips is eliminated if the relevant addressing information is disposed on a fixed portion of container 100 as opposed to a container having a removable top.

In the case that top portion 100 is removable, the process preferably involves scanning both chips to make sure that the correct top is associated with the correct container and package within. In such cases, this avoids the perpetration of fraudulent attempts to associate container contents (packages) with improper destination addresses, such as by substituting different lids.

Figure 24:
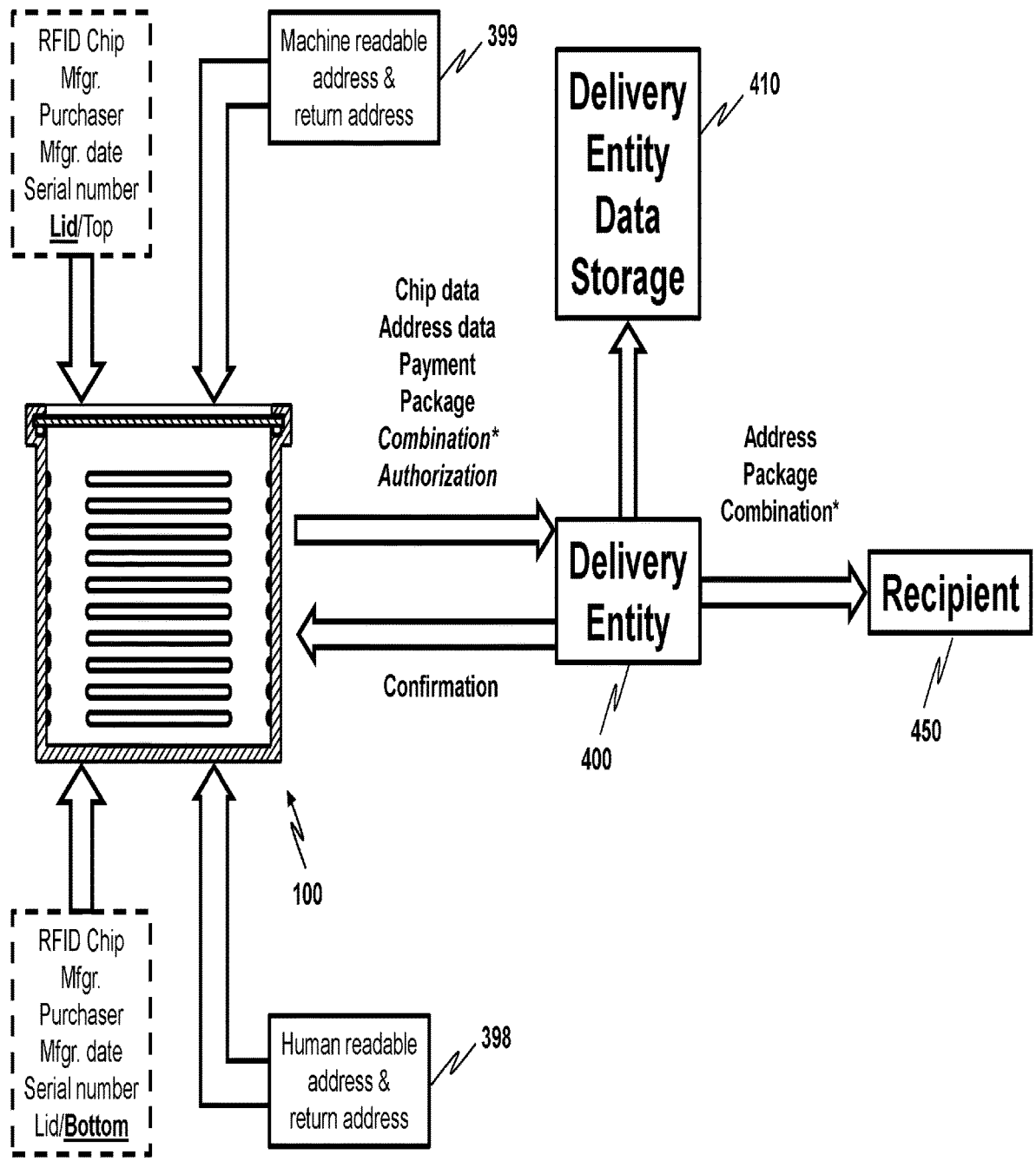
FIG. 24 is a structural flow diagram illustrating the flow of product and its associated information from a source to a recipient through a delivery entity.

Accordingly, in the process of the present invention the manufacturer, seller or distributing entity bears the responsibility of affixing both human and machine readable addresses into appropriate locations (388 and 389 in FIG. 24). The manufacturer of containers in accordance with the present invention bears the responsibility of affixing RFID chips to container tops and bottoms (if necessary) in a manner which assigns an industrywide unique serial number for each container. Delivery entity 400 in FIG. 24 bears thee responsibility for collecting an appropriate payment for transport, bearing in mind such things as weight and distance and/or other criteria that may be determined by delivery entity 400, such as package size and dimensions. Delivery entity 400 also bears responsibility for constructing the unique signature described above (unique container serial number+time/date stamp) and for storing that signature in its database for a time sufficient to complete delivery. Thus at the time of delivery to delivery entity 400 there is generally provided thereto the following: RFID chip data, desired address data in human readable form 398 and in machine readable form 399, payment for transport (possibly including return transport and preferably accomplished via automated funds transfer), the container and its package. Additional information such as discussed below may also be provided.

Delivery entity 400 may also be provided with a combination which opens a lock mechanism such as those described above. At this time, delivery entity 400 may also be provided with an authorization indication automatically permitting return shipment of the container (with or without returned merchandise). This fact is suggested by the presence of italicized words in FIG. 24. Such a combination may be provided for purposes such as being "open for postal inspection." Furthermore, as indicated above, such a combination may also be provided via a secondary route such as the Internet or the U.S. Postal Service or any other convenient routing mechanism. At this time, the sender is also preferably provided with confirmation and/or receipt which verifies the transaction and payment.

At the receiving end, recipient 450 receives package 130 in container 100 together with return addresses in both human and machine readable form to facilitate return of the container (and possibly the package as well). In those circumstances in which it becomes desirable to return merchandise, it becomes very easy for the purchaser/recipient to place the package back in the container and to anchor it down in the same manner in which it was received, close the container, switch addresses and return it to delivery entity 400 to an appropriate address. This address may be an originating address or it may be an address to which a sender has designated for the purpose of receiving a returned container or perhaps for receiving returned merchandise such as those items which are found to be nonfunctional, the wrong size, the wrong color, etc.

In addition to the information indicated above other information may be provided via RFID chips. This information can include such things as container manufacturer, container purchaser, date of manufacture, top or bottom indicator, the size of the container, and/or the tare weight of the container. The empty container weight is a useful piece of information for delivery entity 400 in that it provides an appropriate mechanism for calculating the cost of a return shipment of an empty container. This information is usable by delivery entity 400 at the time of presentation of the container holding package which is typically weighed by this entity as a mechanism for determining its transportation fee. This fee is preferably collected at this time or possibly upon return by the designated recipient or by the original sender at the time of its return. All of these options are rendered possible by the unique signature assigned to the transaction. The transaction typically includes delivery of a package of a determined weight going to a specified destination together with payment as appropriate and a planned return of a (typically) empty container for reuse.

Information which is encoded on the RFID chip(s) may also include indications of the dimensions of the container when it is collapsed. This, like the tare weight, provides a mechanism for delivery entity 400 to be able to easily calculate an appropriate fee for returning the container. Providing a full set of dimensions renders it unnecessary for delivery entity 400 to perform measurements on the container to determine its size. This can result in a significant laborsaving in that, at least for the US Postal Service, it is necessary for Postal Service personnel to measure all three dimensions on a typical package intended for shipment.

Table I provided below lists two kinds of information associated with delivery methods that are employable with the present invention. In general, there are two kinds of such data. A first kind of such data is that which is contained within one or more RFID tags. As indicated above, and as emphasized by underlining in the tables below, a unique serial number is an important part of the RFID tag. The number of digits in this serial number is a matter of design choice but preferable ranges of digit numbers start out at about nine in number. Optionally, one or more of the RFID tags employed may include information identifying a manufacturer, a purchaser, the date of manufacture, an indication of whether or not this is a top or bottom tag and an indication of the tare weight associated with the container in addition to its dimensions. This information is encoded as is or provided in more compact form such as by identifying a manufacturer by number as opposed to an alphanumeric designation. However, since RFID tags can contain as much as 2 kilobytes of information, in general, it should not be necessary to employ a compact form. Shipment specific information, typically provided by the sender, includes a destination address and a return address, amongst other things. Additionally, such information may also include an indication of authorization or approval to return either the container by itself or the container with a package. This information, typically provided by the sender, is also capable of including an indication of the combination associated with a combination lock provided for security purposes, as discussed above. It is also to be very specifically noted that shipment specific information also includes a time/date stamp. The importance of this information is emphasized by its being underlined in the table below. The "*" in the table below is an indication that it is typically information provided by delivery entity 400. An underline indication in Table I and Table II below is an indication that the datum indicated is part of a unique transaction identifying signature, as discussed above. It is important to realize that the serial number of the container coupled with a time/date stamp provides an essentially unique identifier for the transaction underlying the shipment. The sender can also include a RMA form but limit its use to the return of the container alone. This information is preferably encoded on printed media provided by the sender. This puts the use of the present invention squarely within existing mechanisms for package return (that is, the RMA process).

TABLE I

| RFID INFORMATION | Manufacturer<br>Purchaser<br>Date of manufacture<br>Top of container indicator<br>Bottom of container indicator<br>Container tare weight<br>Collapsed size<br><u>Serial number</u><br><u>Combination</u> (Optional) |
| --- | --- |

TABLE II

| SHIPMENT SPECIFIC INFORMATION IN SCANNABLE CODE | <u>Time/Date Stamp</u>*<br>Destination Address<br>Return Address<br>Payment*<br>Is this a merchandise return?<br>Return Authorization Code<br>Return of container only |
| --- | --- |

It is noted that the use of RFID tags is not essential to the practice of the present invention. In particular, it is observed that machine-readable codes such as the QR code is capable of displaying as much as 4 kilobytes of information. As used in the present invention, the information which is generally stored in a RFID tag is the information which is relatively permanent and describes fixed properties of the container such as its size, its dimensions, its weight, a unique serial number, type of top, maximum carrying weight and/or other particular physical features that do not change over time. This information is also capable of being imprinted in the form of a QR code or other code on the exterior of the container. This information could be duplicated on the top, bottom and/or sides of the container for easy readability and for redundancy. Preferably, it is provided in a medium having good contrast for readability.

Collapsibility

It is anticipated that the container of the present invention is returned to the shipper at some point in time. For space conservation purposes on the return trip, it is desired, though not required, that the container be capable of being collapsed to a smaller volume. This is not an option that is exercised in the event that the container is used to return sent merchandize (for whatever reason the seller might approve). Since return shipping in a collapsed form is likely to expose joints and hinged elements present to achieve collapsability, it is not an option that provides maximum protection against the elements of rain, sleet, snow and wind. However, in almost all cases, it is still acceptable since returned containers are almost always empty. In the case of merchandise being returned, the container is not collapsed.

The ability to collapse a container shaped like a rectangular parallelepiped is not new. Containers such as this have been available as collapsible file boxes for over twenty-five years. At one time such containers were sold at the RPI bookstore for use by students. These collapsible containers have relatively flat, hinged end faces that fold downwardly from their bottoms and also fold inwardly. The end faces are hinged at the bottom and fold inward and lay flat against the bottom of the file. The side faces are hinged in the middle and at their tops and bottoms. The side faces fold inwardly at the middle. Clearly, the container must be dimensioned, especially with respect to its height and width such that there is no interference between the inwardly folding sides which are moved inwardly toward the opposite side upon collapsing. The resultant collapsed object has the same "footprint" as the original but is now significantly reduced in height and correspondingly reduced in volume.

However, used simply by itself, such a collapsing structure such as that described above was not intended for use as a returnable shipping container. For example, such collapsible file storage containers did not contemplate closed structures in which a top or lid for closure was either desired or required. There was no mechanism for a top, much less one for securing the top and bottom together. Even more particularly, such containers were never intended as shipping boxes. As such, they suffer a significant drawback in that in their collapsed state there was nothing which secured them in that state. Changing their orientation, a common occurrence encountered in any delivery system, would result in their expansion not only into an uncollapsed state but into a state where the fully expanded and locked state would not be achieved. In other words, if used in the present shipping container context, these collapsible file boxes would flop around in various states when shipped in their collapsed state during their return trip. Put yet another way, these collapsible containers had no mechanism to assure that they remained in their collapsed state, with the possible exception of their own original wrapping (which is irrelevant to the present issue). Such crates also did not possess any structures such as ridges or grooves (105 or 106) for the purpose of retaining structures such as flexible retaining strip 150 to anchor packages.

Figure 20:
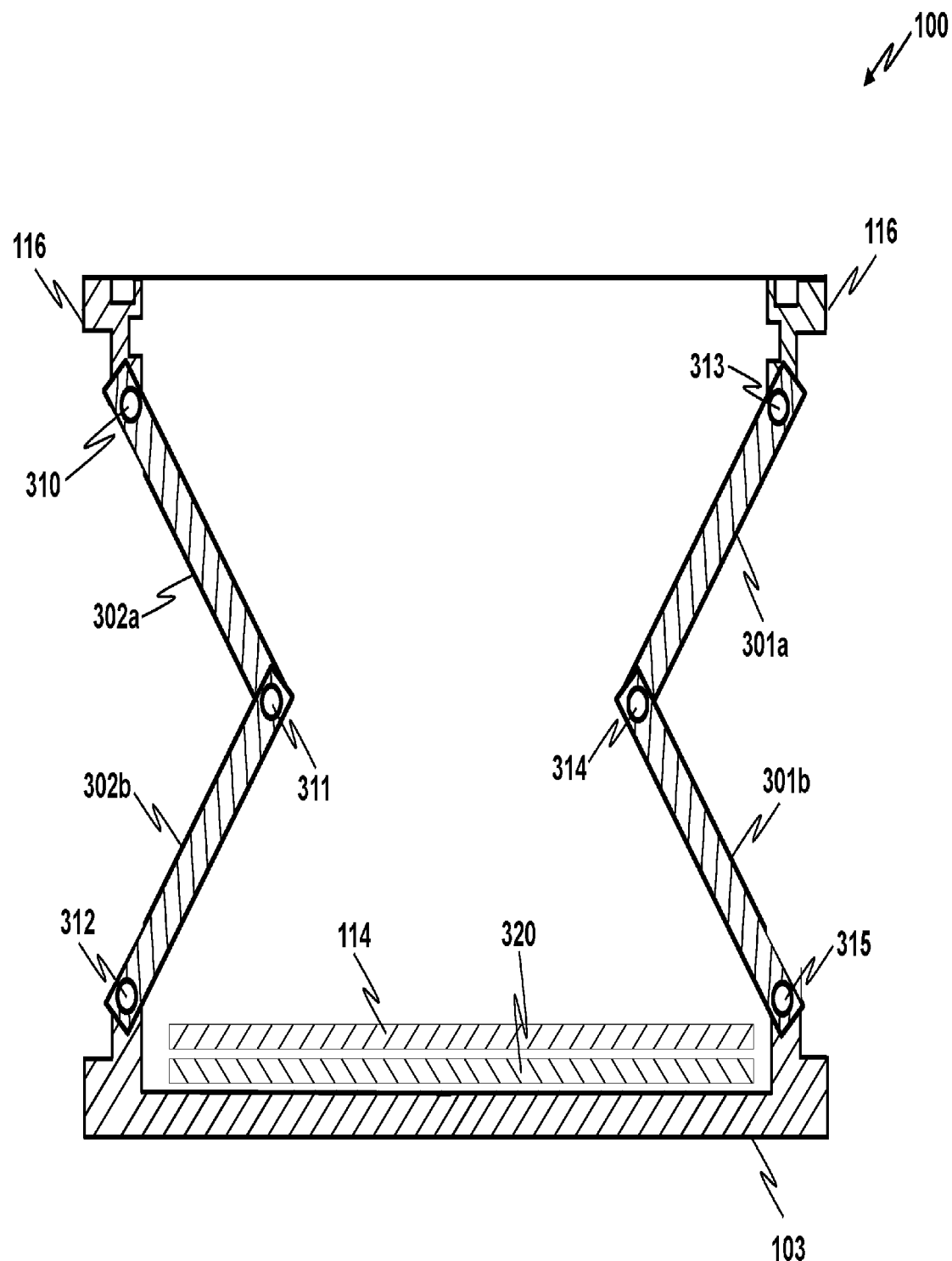
FIG. 20 is a cross-sectional, front elevation view of a container in accordance with the present invention which incorporates a collapsability feature.

The above described collapsible structure for a container intended for shipping is illustrated in FIG. 20. In this case it is seen that side 301 is provided as a hinged structure with upper portion 301*a* and lower portion 301*b*. Hinge pin 314 connects these two side portions together (301*a* and 301*b*). Hinge pin 311 connects side portions 302*a* and 302*b*. The hinged sides attach to upper portion 116 which comprises a rigid, substantially rectangular frame. Hinge pin 315 connects lower portion of right side 301*b* to bottom 103 of container structure 100. Matching structures 302*a* and 302*b* together with associated hinge pins 310, 311 and 312 are seen on the left side of the collapsible structure shown in FIG. 20. Also visible in this figure, it being a cross-sectional side elevation view, are rear wall 320 and front wall 114 folded inward and downward so as to lie flat on bottom 103 of container 100. It does not matter which of these two walls lies adjacent to bottom 103.

Figure 21:
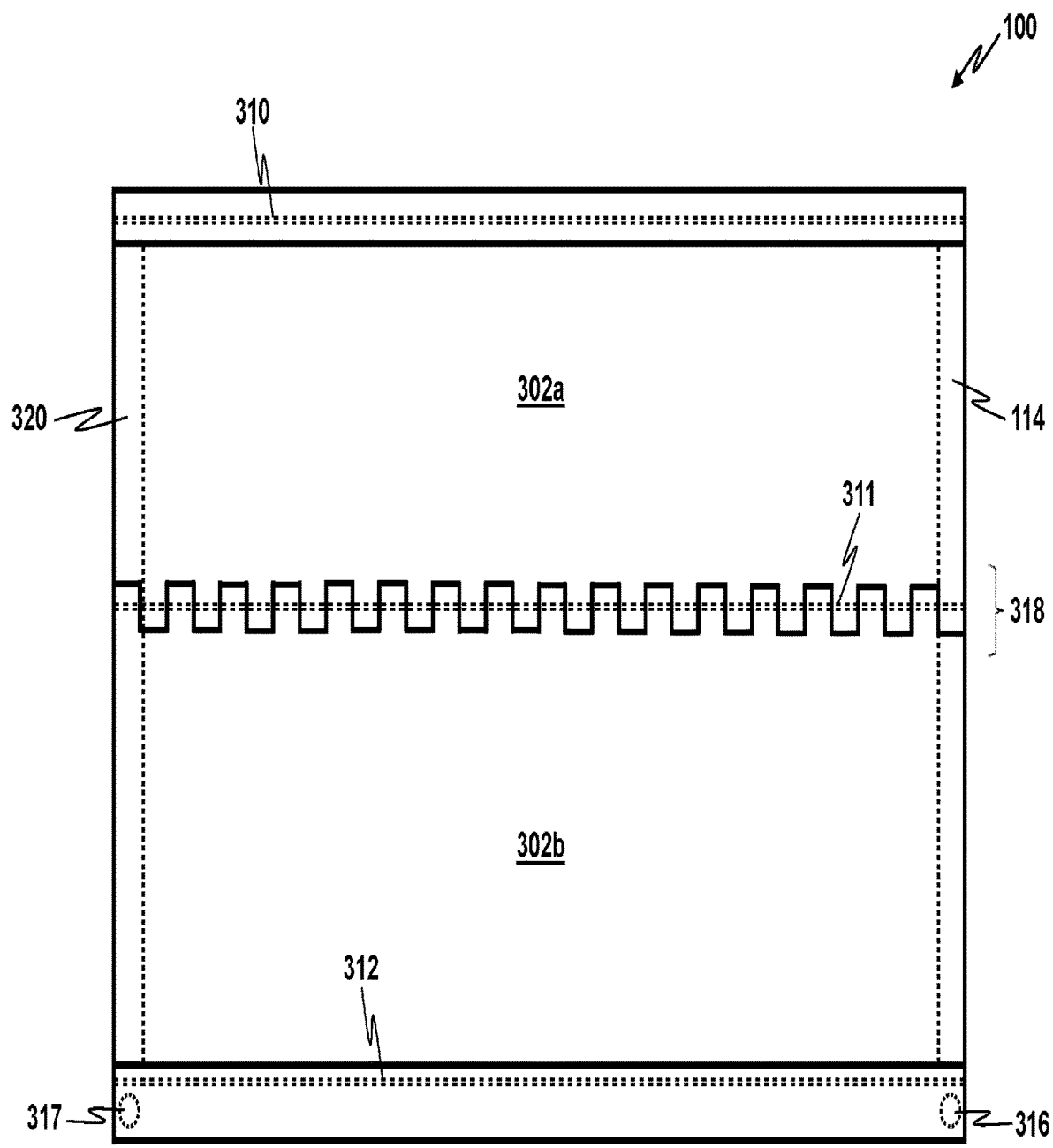
FIG. 21 is a side elevation view of the container illustrated in FIG. 20 which more particularly illustrates the position of hinge pins and interdigitated side structures.

A side view of a collapsible structure such as that shown in FIG. 20 is illustrated in FIG. 21. This is a view showing the so-called left side of the container. In particular, it is seen that side 302 includes upper portion 302*a* and lower portion 302*b* which are joined in the middle in an interdigitated fashion, much like a piano hinge. In particular, it is noted that this figure is especially useful for illustrating the location of pins 310, 311 and 312. Also shown, in phantom view, are the location of pins 316 and 317 which are used for pivoting front wall and back wall members downwardly and inwardly toward the center of container 100. As shown in FIGS. 20 and 21 the illustrated structures are essentially the same as those found in the above identified collapsible file boxes available-for-sale at least 25 years ago, with the differences as noted.

Figure 22:
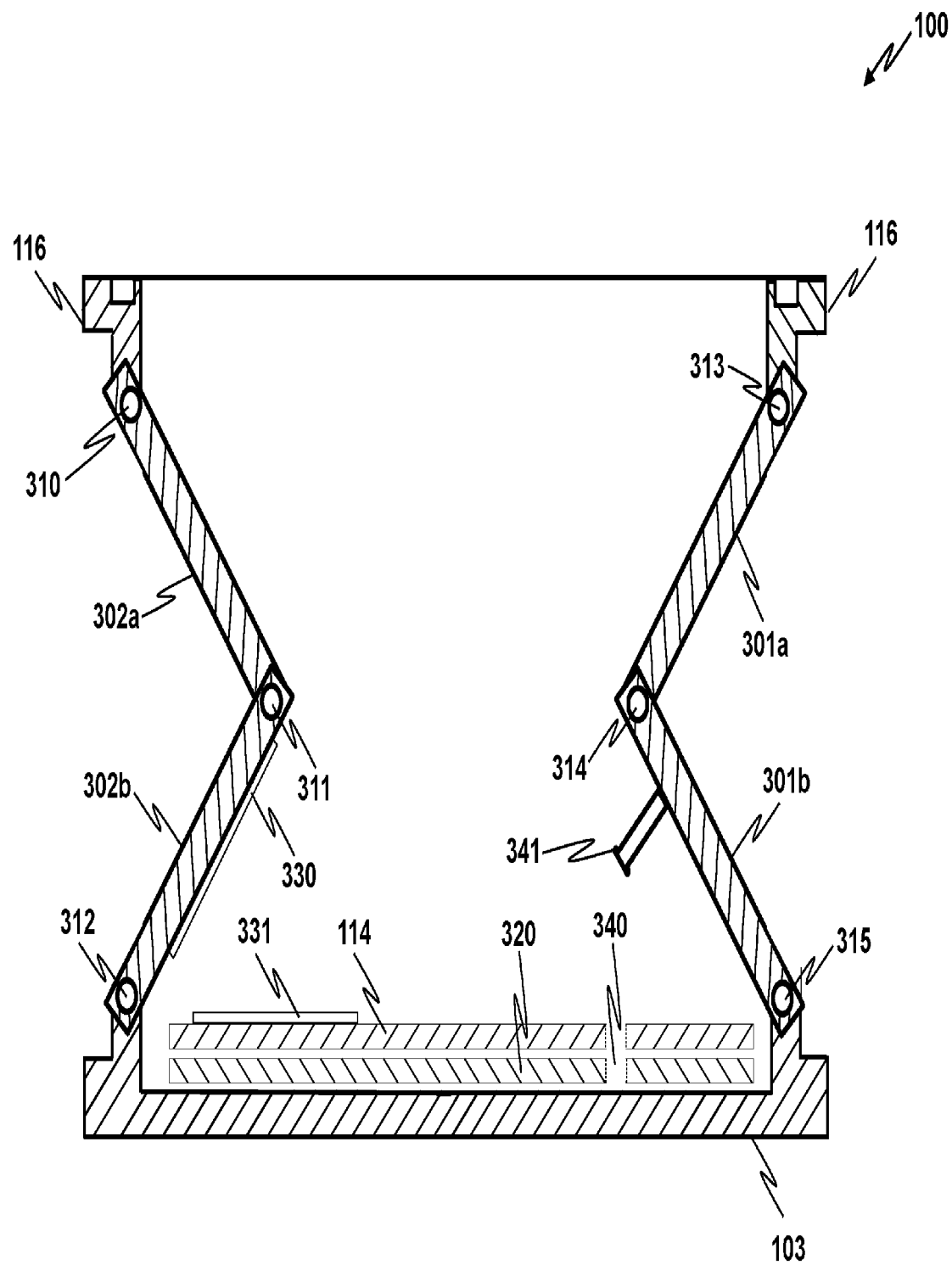
FIG. 22 is a cross-sectional, front elevation view of a collapsible container which more particularly illustrates two of several mechanisms for assuring that the container maintains its collapsed form during return shipment.

However, the structures illustrated in FIGS. 20 and 21 lack the ability to stay closed in an environment consistent with package and parcel delivery services. Accordingly, FIG. 22 illustrates two mechanisms by which previously available structures can be converted to ones that are useful in a returnable shipping container. In particular, front wall 114 and rear wall 320 are provided with openings 340 which align when folded inward and which accept flared peg 341 which fixes the structure in a closed position sufficiently tight for return transit. As a replacement or substitute therefore, it is also possible to provide previous structures with hook and loop pads (Velcro®) 330 and 331 which hold the structure in a collapsed position for return transport.

It is also noted that, instead of providing relatively complicated hinge structures as shown in FIG. 22, sides 301 and 302 of container 100 may also comprise a flexible material with structural integrity being provided by more rigid front and back structures which lock into place when moved into their upright positions. This aspect of the front and back portions applies equally well to the structures described above. Sides 301 and 302 may also include relatively rigid plastic structures which are scored in places where the aforementioned pins are placed so as to provide lines of flexibility. Such scoring provides decidedly preferential locations and lines along which sides 301 and 302 may be inwardly bent in essentially the same manner as shown in FIGS. 20, 21 and 22. Accordingly, when the present invention is implemented as a collapsible unit, it is provided with fasteners to assure that, once collapsed, it stays collapsed.

Figure 25:
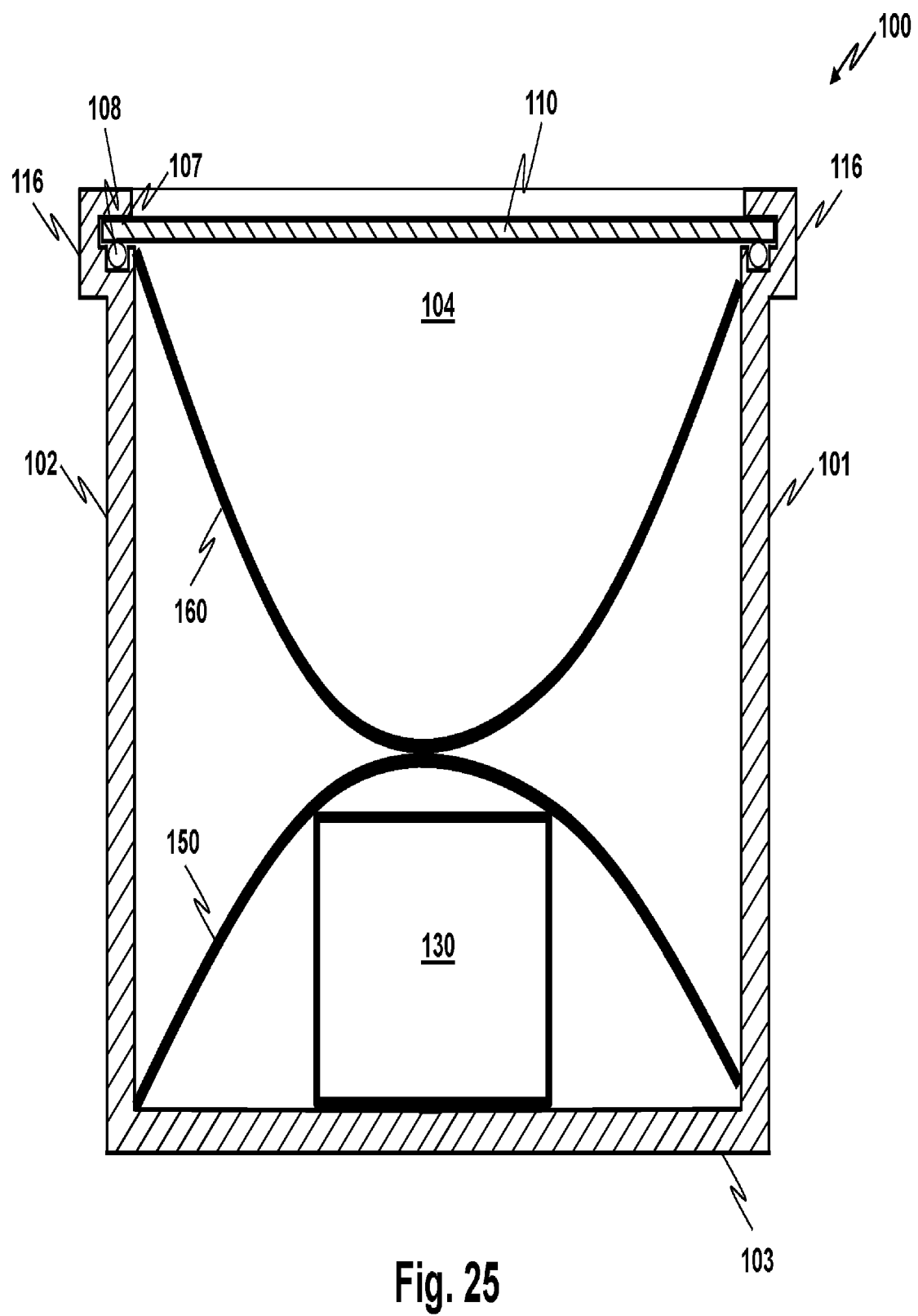
FIG. 25 illustrates the use of a restraining element used to guard against vertical movement of the package within the container and is usable even in situations where interior container ridges are not employed.

While the package restraining systems of the present invention are preferably employed in systems in which return of the container is a desired objective, it is also possible to employ restraining structures 150, 151 and 152 (see FIGS. 11 and 12) in any conventional shipping container that includes ridges or slots for engagement therewith. Accordingly, the scope of the present invention also includes any container possessing such engaging structures. While not achieving the goal of returning the container for repeated reuse, when used in this way, it nonetheless eliminates the need for buffering or filler materials, which are most likely simply just discarded later. It is also noted that the restraining structures of the present invention (notably elements 10, 151 and/or 152) may be employed without the need of side ridges. In such cases, one may employ restraining element 160 as shown in FIG. 25 to insure against movement in a vertical direction. Restraining element 160 may engage either a lip included around the upper inner edges of container 100 or may be held in place by top 110.

In furtherance of the objective of promoting easy stacking of containers of the present invention, particularly those owned and processed by a single distributing entity, it is advantageous to dimension the containers with exterior dimensions that are powers of 2 or some other number. In particular, the height of a container is preferably selected to be some multiple of the same container's height when it is collapsed.

When considering the fact that the container may be collapsed for return shipping, the size and shape of restraining strip 150 (and related restraining structures) should be considered. In particular, in the instance of being in a collapsed state for return, it is desirable that the restraining element be present in two pieces. The strip that extends from side to side in the container (or whatever dimension is shorter) is easily rotated and placed in the bottom of the returning container. The strip that extends in the long direction is preferably narrower so that it may be placed diagonally in the bottom portion of the container for return purposes. To prevent the restraining strips from being separated, the embodiment shown in FIG. 12 also includes rivet 170 (or other convenient fastener) to provide a permanent connection between the two restraining strip portions and to allow rotation so that, upon return transport, they are both easily fitted into the bottom of the container.

Water Shedding Lid

Figure 26:
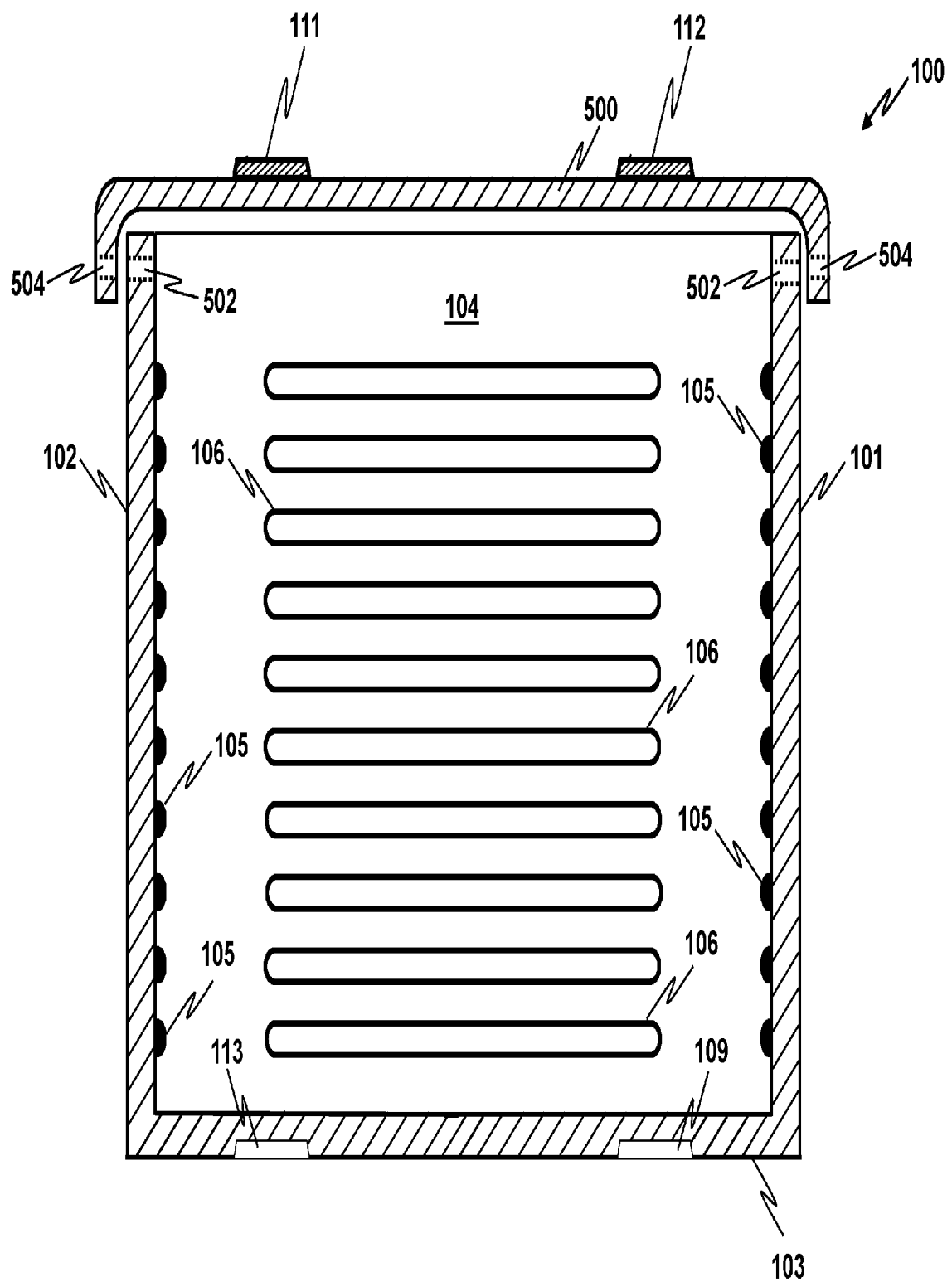
FIG. 26 a cross-sectional, front elevation view of a container in accordance with the present invention illustrating a variation in the structure of the top portion of the container and more particularly illustrating a top which sheds rain.

As has been indicated above, it is generally desirable to be able to keep the lid or cover together with the rest of the container. This obviates the potential need for providing more than one RFID chip. Additionally, it is noted that protection against water, rain and the elements is provided in some of the structures discussed above through the use of an O-ring seal. While this is one way to provide protection against water entry, it is also possible to employ a cover having edges which extend down over the top frame of the container structure. Such a structure is shown in FIG. 26. As shown in FIG. 28, this lid is hinged. FIG. 26 is a cross-sectional side elevation view of one embodiment of the present invention employing a lid which is intended for permanent attachment to the container beneath. As with respect to any packaging container, it is desirable to provide an easy mechanism for opening the container. In the embodiments discussed above, this opening is provided by means of a sliding top. With respect to a sliding top, there is also disclosed a locking mechanism for providing security. However, when the lid is hinged and is intended to pivot to an opening position, a different security mechanism is employed. Nonetheless, as with the security systems described above a lock assembly operates to move a bolt through an opening. With respect to the embodiments shown in FIG. 26, there is provided opening 502 in the sidewalls 101 and 102 of container 100. While it is possible to employ a locking mechanism with doubly moving bolts, it is noted that it is only necessary to employ openings in one side of the container. Aligned there with and corresponding thereto, there is also provided openings 504 in lid structure 500. Apart from these variations, similarly numbered parts of FIG. 26 at the same structure as other numbered parts in the earlier drawings. Most notably openings 502 and 504 provide one or more openings for a locking bolt to be inserted. In the embodiment of the present invention in which the lid is hinged and attached, locking is provided by means of horizontal balls motion as opposed to vertical bolt motion.

Figure 27:
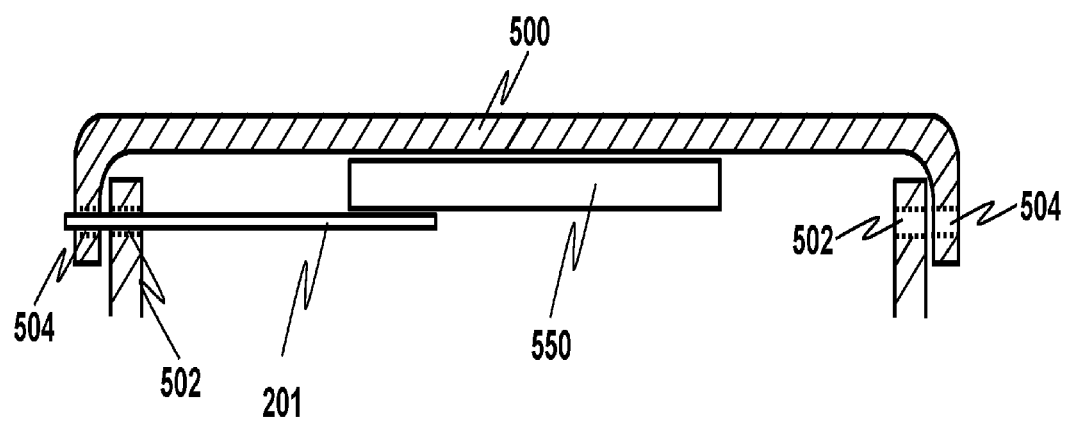
FIG. 27 is a cross-sectional, front elevation view of a container in accordance with the present invention illustrating the use of a combination lock having a slidable bolt which engage openings in the container and in the top (lid) of the container.

FIG. 27 more particularly illustrates the use of the combination lock of the present invention in conjunction with permanently affixed, hinged lid 500. In particular, it is seen that lock assembly 550 is disposed on the underside of the lid and the corresponding movable bolt moves horizontally through openings 502 and 504. The operation is essentially the same except that it occurs in a different plane.

FIG. 28 is a side elevation view illustrating the fact that lid 500 is hinged using pen 506. Also visible is opening 504 in lid 500 through which bolt 201 is disposed when the package is locked. Not visible in FIG. 28 is the fact that lid 500 also includes a notched out portion along the back edge so as to facilitate hinging motion.

Figure 29:
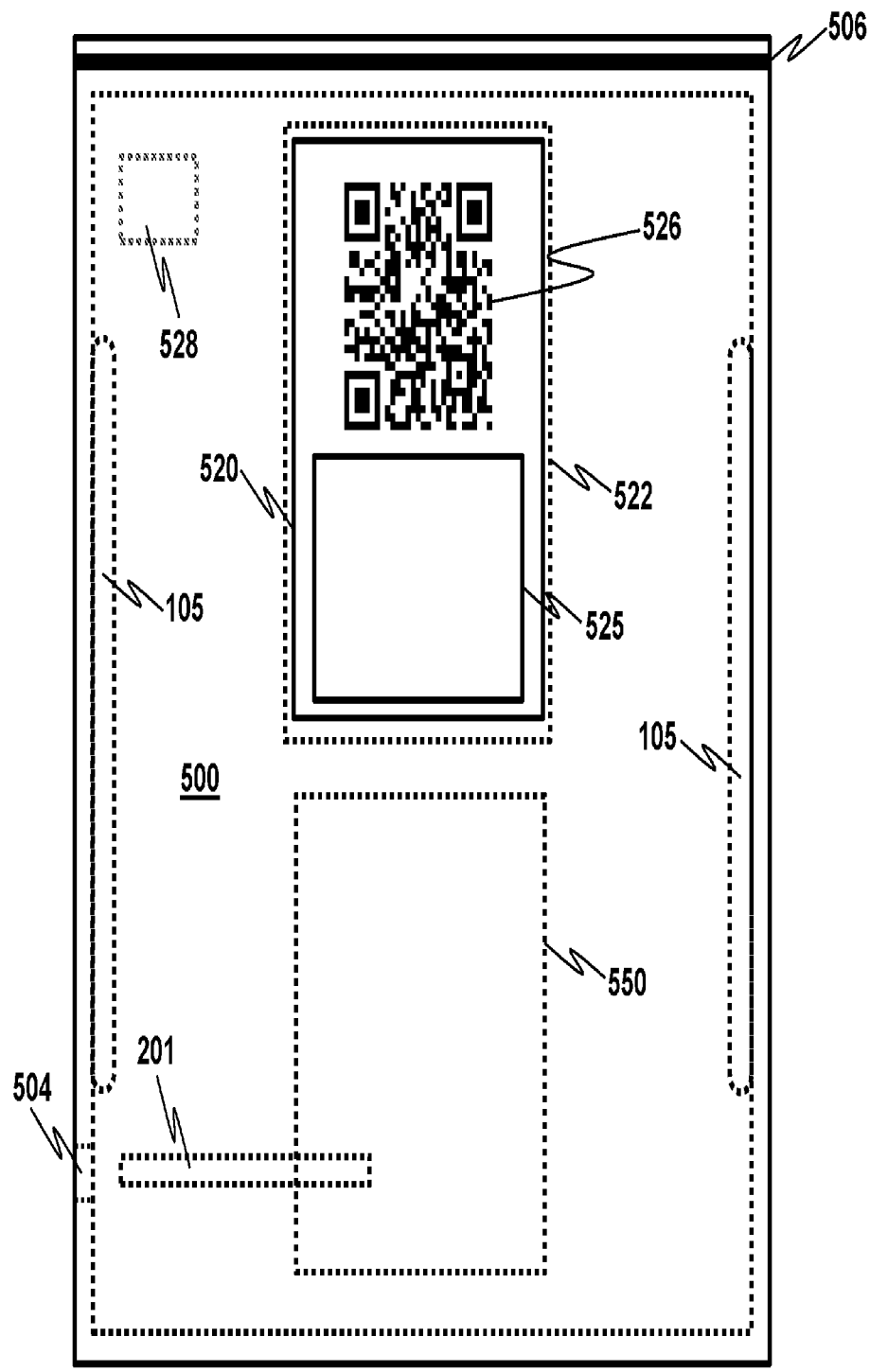
FIG. 29 is a top view of an exemplary top which particularly illustrates the placement of both human readable and machine readable address information.

FIG. 29 is indicated as having hinge pin 506 and suggesting that, as a top cover, it moves in a rotating motion, with hinge pin 506 being an axis of rotation. Additionally, lock assembly 550 together with bolt 201 are shown in phantom view beneath the lid. The hinge and lock assembly 550 and bolt 201, as shown, are unique to the permanently affixed version of the lid from FIGS. 26 through 28. However, there are other elements shown in FIG. 29 which are also applicable to the slidable tops discussed above (110, 110a, etc.). In particular, there is shown the possible position for an RFID chip 528. However, and more importantly, one of the features that is equally applicable to all of the lid structures presented herein is transparent viewing window 520. In the more secure embodiments of the present invention this window is provided with a slot or pocket 522 on the underside (interior) of the lid for accepting and holding the printed media discussed herein. This printed media preferably has two sides. The sides may be color-coded as an added in this year of the direction of transport. For example, the printed medium may include green markings on its original trip to the end recipient with red markings to indicate its return to the point of origin or other desired destination. For example, a manufacturer/shipper may opt to have all of the containers it uses returned to a single central location. One side is for the initial transport of the package; the other side is for its return. In particular, this medium includes two portions: a first portion 525 displaying human readable address information; a second portion 526 displaying machine-readable information which preferably includes an address but which may also include other information pertinent to the transport of the package. This medium, once the package is opened, is preferably flipped over so that the reverse side is visible through transparent window 520.

The Process

It is perhaps desirable at this juncture to describe a typical shipping process used in conjunction with the present invention. The process begins with the placement of an order by a consumer who selects an address for its delivery along with the product to be shipped. This information is collected by the merchant who determines, from the merchant's product database, the size and weight of the package. Based on this latter information, the merchant selects a container of the appropriate size along with one or more appropriately sized restraining elements. At this time, the merchant prepares a printed medium bearing on its first side a machine-readable indication of the package's destination address as provided by the purchaser. This printed medium also includes, on a different portion thereof, a machine readable version of the purchaser's address. Based on the weight of the container and the weight of the product, as determined from the merchant's database, this machine-readable information may also include the size and shipping weight of the package and container. At this time, the merchant is also capable of reading a serial number of the container from an RFID chip or may in fact generate a random but unique serial number without the use of an RFID chip. This information may be combined with a time and/or date stamp to produce a unique transaction identification number.

On the reverse side of this medium, the merchant provides a machine-readable version of a return address and a human readable version of that same address. The machine-readable portion may also contain additional information with respect to whether or not the address indicated is one for return of the product or rather for recycling of the container. This information by the merchant may also include an indication of whether or not the merchandise itself may be returned. If so, this information essentially acts like a preapproved RMA. The merchant then combines the package, the container and the printed medium in a manner which renders the medium both protected and visible. The container and its enclosed product is then provided to a delivery service which reads the machine-readable information presented on the printed medium. The delivery service is thus able to discern the merchant, the weight of the package, the unique transaction identifier and the destination. Using this information the delivery service bills back the cost of shipping to the merchant. At this time, the cost of return shipping of the container alone may also be included. The delivery service then delivers the container with its package and the printed medium to the purchaser.

In the case of a secure delivery, the purchaser will have been provided with either a physical or alphanumeric key for entry into the package. Preferably this key is provided prior to delivery of the package. Clearly the route of a physical key or a key in the form of information should be different than the route taken by the delivery of the package. If the delivery is not a secure one, the purchaser is simply able to cut off any zip tie (or similar device) that keeps the cover and container from being opened. Security may also be provided in the form of a zip tie which is unique to the merchant. The purchaser then opens the package and inspects it. If it is satisfactory, the purchaser flips the printed medium over to the other side and inserts it into the pocket underneath the lid so that its information contents are visible through a transparent window. The purchaser then takes the package with the flipped printed medium inserted to a package delivery agent, preferably the same one that delivered the package in the first place. However, it is generally desirable that, because of its relatively universal presence, there exists a contractual relation with the US Postal Service for the return of such packages.

In the event that a combination lock of the kind discussed herein is present when the package is shipped, since the recipient is provided with means to open the combination lock, there is no issue with respect to the return of the container by itself. In those circumstances (RMA cases, e.g.) in which the contents of the package are to be returned (most likely to a different address) as well, it is a simple matter for the recipient to relock the package so as to provide the same level of security achieved on initial transport. This requires that the sender/merchant keep track of the combination in a database in which the combination is associated with the serial number for the container. If security was provided in the form of a zip tie unique to the sender/merchant, a RMA is provided simply by including an intact zip tie having permission granting indicia.

With respect to the US Postal Service is noted that it sometimes becomes either necessary or desirable for this Service to open a package for inspection. In the case of a package having a secure combination, it is possible for the Postal Service to read the machine-readable information so as to identify the sender and to provide a unique transaction identification number. Hopefully, for a secure shipments, the merchant will have kept track of the combination (for any lock/security device) and its associated unique transaction number. With this information the merchant can provide the Postal Service with the information it needs to physically open the package for inspection. As pointed out above, while the present invention provides a degree of security which is higher than that which is already available, there is no perfect assurance against theft or tampering. Knowing this, in emergency situations it is expected that, if necessary, the US Postal Service would open the package in the most expeditious and safe manner with all due regard to the legal rights of the merchant and purchaser and the safety of Postal Service personnel.

Deposit

It is clear that the containers of the present invention possess an intrinsic value of their own. It is possible that purchasers of goods that are provided in these containers could decide to retain possession of the containers. This would certainly defeat the desired purpose of recycling them back to their point of origin for reuse. In this regard, it is noted that the machine-readable portion of the medium provided by the merchant preferably includes a unique transaction identification number which is preferably a combination of an order identification number and/or a serial number for the container together with a time and date stamp. It is the presence of this time/date stamp that provides a mechanism for ensuring return of the container. The agreement with the purchaser includes a provision which authorizes a charge back to the purchaser on their credit card if the container is not received back at the merchant's location within a specified period of time. In the case of cash or check transactions, an actual deposit is collected and returned when the container arrives back at the merchant's destination.

Marking

As indicated elsewhere herein, one of the objects of the present invention is the automation of packaging and shipping. Clearly these operations involve handling of the container during which it is apt to be positioned in multiple different orientations. However, as discussed above it is nonetheless desirable to be able to scan the machine-readable portion of the address information and address-like information at various points in the shipping process. In order to facilitate this, the container of the present invention is preferably provided with an indication of which side is "up." This indicia may be a different colored top or any other marking that would provide an indication of the location of the machine-readable medium.

As a convenience to the reader, there is provided below a list of parts associated with the present invention as indicated by their respective reference numerals, as shown in the associated figures. As a synopsis of the various structures and assemblies employed in various embodiments of the present invention there is provided the following list of parts in ascending order according to their reference numerals.

Parts List

| Reference Numeral | Item |
|---|---|
| 100 | Container |
| 101 | Right side of container |
| 102 | Left side of container |
| 103 | Bottom of container |
| 104 | Back of container |
| 105 | Ridges or grooves along sides of container |
| 106 | Ridges or grooves along back of container |
| 107 | Groove in the top of container for accepting sliding top |
| 108 | O-ring for sealing |
| 109 | First depression on bottom to match protrusion on top |
| 110 | Sliding top for container closure |
| 110a | Sliding top with top overlap for container sealing |
| 110b | Snap-on top |
| 111 | First protrusion on top for improved stacking |
| 112 | Second protrusion on top for improved stacking |
| 113 | Second depression on bottom to match protrusion on top |
| 114 | Front wall |
| 116 | Top flange extending around container |
| 117 | Bottom flange extending around container |
| 118 | Interlocking protrusion for anchoring top 110b |
| 119 | Slot in upper flange for accepting protruding pins 118 |
| 120 | Generic appearance for top view of container top |
| 121 | Loop/opening for combination lock, zip tie or other closure device |
| 122 | Slotted area for displaying currently active destination address |
| 123 | Currently active address being shown |
| 124 | Transparent protector through which human readable addresses shows |
| 125 | Slider for changing indicated address |
| 126 | Slide handle for slider 125 |
| 127 | Slot into which 124 slips along with human readable address form |
| 128 | RFID chip for the top of container; or exterior machine readable code |
| 130 | Package to be shipped |
| 138 | RFID chip for container itself, as opposed to just its top |
| 150 | Flexible retaining strip to anchor package |
| 151 | Flexible retaining strip used with corresponding cross strip retainer |
| 152 | Unitary retaining strip for anchoring to front and back |
| 153 | Rear wall anchor for use with elastomeric cord |
| 153a | Alternate anchor structure |
| 154a | First retaining cord hook/anchor; used with anchor 156 |
| 154b | Second retaining cord hook/anchor; used with anchor 159 |
| 155 | Elastomeric cord for anchoring package |
| 155a | Belt material for securing package |
| 155b | Buckle for tensioning 155a |
| 156 | Upper left wall anchor for use with elastomeric cord |
| 156a | Alternative, flatter wall anchor |
| 157 | Lower left wall anchor for use with elastomeric cord |
| 157a | Alternative, flatter wall anchor |
| 158 | Lower right wall anchor for use with elastomeric cord |
| 158a | Alternative, flatter wall anchor |
| 159 | Upper right wall anchor for use with elastomeric cord |
| 159b | Alternative, flatter wall anchor |
| 160 | Retaining element used in a ridge-free environment |
| 170 | Rivet for attaching restraining strips and for facilitating rotation |
| 201 | Sliding bolt element to lock lid in place |
| 202 | Link from bolt to bell crank |
| 203 | Bell crank to change direction of force applied to bolt |
| 204 | Motion arm connected to bell crank |
| 205 | User operated knob for moving arm 204 left and right |
| 206 | Slot for shouldered rivet 207 |
| 207 | Shouldered rivet |
| 210a-e | Slidable combination defining elements |
| 211a | Notch in tumbler 210a |
| 215a-c | Slidable combination element with key engaging slots |
| 216 | Knob for keyed slider |
| 217 | Keyed slider |
| 218 | Key pattern |

-continued

Parts List

| Reference Numeral | Item |
|---|---|
| 219 | Second bell crank to change direction of force applied to bolt |
| 220 | Barrier |
| 221 | Link between barrier 220 and bell crank 219 |
| 222 | Shoulder ridges positioned to match key pattern |
| 227 | Shoulder rivet for secondary movement |
| 230 | Combination lock |
| 301a | Upper right side of collapsible box |
| 301b | Lower right side of collapsible box |
| 302a | Upper left side of collapsible box |
| 302b | Lower left side of collapsible box |
| 310-315 | Pin hinges for collapsible box sides |
| 320 | Back of the container when folded |
| 316 | Pin hinges for collapsible box front |
| 317 | Pin hinges for collapsible box back |
| 318 | Interdigitated portion of collapsible sides |
| 330 | Velcro ® pad |
| 331 | Matching Velcro ® pad |
| 340 | Openings to engage pin 341 |
| 341 | Pin to lock container in closed position |
| 500 | Water repelling lid |
| 502 | Opening in container for receiver slidable combination lock bolt |
| 504 | Opening in lid for receiver slidable combination lock bolt |
| 506 | Hinge pin for lid 500 |
| 520 | Transparent opening sheet for viewing address information |
| 522 | Pocket under lid 500 for receiving address information |
| 525 | Human readable address information |
| 526 | Machine readable address information |
| 528 | RFID or similar chip; or exterior machine readable code |
| 550 | Combination lock assembly |

It is noted that the claims herein refer to left and right sides and to front and back walls. The terms "sides" and "walls" are interchangeable as are the terms "front" and "back" these all being relative to the viewing position. Likewise, "top" and "bottom" can be reversed if the container is gravimetrically turned upside down. It is also noted that at times in the present description reference is made to container 100; sometimes this refers simply to the bottom of container without top 110, sometimes top 110 is included. That which is intended is made clear by context. It is also noted that while anchoring is preferable in two directions, there are circumstances in which anchoring by use of a single anchoring element in one direction is acceptable.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC § 112, sixth paragraph, unless the element is expressly recited using the phrase "means for."

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

The invention claimed is:

1. A container for shipping a package, said container comprising:
a rigid structure for containing said package and having a closable opening;
a flat panel providing closure for said closable opening;
a transparent window on said flat panel;
a first structure on one side of said flat panel holding a first removeable printed medium so as to be visible through said transparent window,
and a second structure that includes an opaque slidable portion moveable between a first position and a second position to hide or reveal a second set of printed medium,
said first printed matter medium containing information coded in a format which facilitates requires machine readability, said information including a first address and which also separately includes human readable information which also includes said first address, said printed medium also including, on its reverse side, a second address indicating an address in human readable form and also in a form which requires machine readability of an address to which said container is to be returned.

2. The container of claim 1 in which said flat panel comprises a hinged lid.

3. The container of claim 1 in which said flat panel comprises a slidable lid.

4. The container of claim 1 in which said coded information includes additional information selected from the group consisting of time, date, and time and date.

5. The container of claim 1 in which said coded information on said reverse side includes an indication that the container is returnable with its original contents.

6. The container of claim 1 in which said coded information is in the form of a QR code.

7. The container of claim 1 in which said first structure is located on the underside of said flat panel.

8. The container of claim 1 in which said flat panel is affixed to said container with a secure fastener.

9. The container of claim 1 in which said flat panel is affixed to said container with a lock.

10. The container of claim 9 in which said lock is a combination lock, whereby the lock may be opened with a combination delivered to a recipient via a different path than said container.

11. The container of claim 1 in which said coded information is in the form of a UPC code.

12. The container of claim 1 in which said container includes a flexible structure therein which facilitates containment of packages having various sizes.

13. The container of claim 12 in which said container comprises internal ridges which accept a flexible package containment element.

\* \* \* \* \*